US011064784B2

(12) United States Patent
Lin et al.

(10) Patent No.: US 11,064,784 B2
(45) Date of Patent: Jul. 20, 2021

(54) PRINTING METHOD AND SYSTEM OF A NAIL PRINTING APPARATUS, AND A MEDIUM THEREOF

(71) Applicant: SHENZHEN DANYA TECHNOLOGY CO., LTD., Shenzhen (CN)

(72) Inventors: Zhenqing Lin, Shenzhen (CN); Ran Li, Shenzhen (CN); Peng He, Shenzhen (CN); Huanhuan Liang, Shenzhen (CN)

(73) Assignee: SHENZHEN DANYA TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/506,017

(22) Filed: Jul. 9, 2019

(65) Prior Publication Data
US 2020/0221849 A1 Jul. 16, 2020

(30) Foreign Application Priority Data

Jan. 14, 2019 (CN) .......................... 201910032943.5
Jan. 14, 2019 (CN) .......................... 201910032951.X
(Continued)

(51) Int. Cl.
*A45D 29/00* (2006.01)
*G06F 3/12* (2006.01)
(Continued)

(52) U.S. Cl.
CPC ............ *A45D 29/00* (2013.01); *G06F 3/0488* (2013.01); *G06F 3/1219* (2013.01); *G06T 7/90* (2017.01); *A45D 2029/005* (2013.01)

(58) Field of Classification Search
None
See application file for complete search history.

(56) References Cited

U.S. PATENT DOCUMENTS 6,286,517 B1    9/2001 Weber et al.
2012/0103210 A1   5/2012 Hashimoto
(Continued)

FOREIGN PATENT DOCUMENTS

CN    1540499 A    10/2004
CN    1806713 A    7/2006
(Continued)

OTHER PUBLICATIONS

International Search Report in PCT/CN2019/104696 dated Nov. 27, 2019, 5 pages.
(Continued)

*Primary Examiner* — Thomas D Lee
(74) *Attorney, Agent, or Firm* — Metis IP LLC

(57) ABSTRACT

The present disclosure may relate to a printing method, system of a nail printing apparatus, the nail printing apparatus and a medium thereof. The nail printing apparatus may include a touch screen. The touch screen may display a first interface. The first interface may include a third region and a second region. The third region may include a plurality of second patterns. The printing method may include displaying a user's nail model in the second region. The printing method may include displaying a first pattern in the second region. The user's nail model may overlap at least a portion of the first pattern. The at least a portion of the first pattern overlapping the user's nail model may be used as a printing pattern. The printing method may include printing the printing pattern based on a printing instruction. The present disclosure may reduce the pattern to be printed, save ink, prolong a usage time of the ink cartridge, and help reduce costs. The present disclosure may reduce two processes of coating anti-overflow glue before printing and cleaning the anti-overflow glue after printing, thereby improving the nail printing efficiency.

12 Claims, 16 Drawing Sheets

(30) Foreign Application Priority Data

| | | |
|---|---|---|
| Jan. 14, 2019 | (CN) | 201910032969.X |
| Jan. 14, 2019 | (CN) | 201910032978.9 |
| Jan. 14, 2019 | (CN) | 201910033488.0 |
| Jan. 14, 2019 | (CN) | 201920066496.0 |

(51) Int. Cl.
*G06T 7/90* (2017.01)
*G06F 3/0488* (2013.01)

(56) References Cited

U.S. PATENT DOCUMENTS

| | | | |
|---|---|---|---|
| 2013/0038647 A1 | 2/2013 | Hashimoto | |
| 2013/0038648 A1 | 2/2013 | Kasahara | |
| 2013/0106970 A1 | 5/2013 | Yamasaki | |
| 2014/0063084 A1* | 3/2014 | Yamasaki | B41J 3/4073 347/3 |
| 2015/0007841 A1 | 1/2015 | Yamasaki | |
| 2015/0375526 A1 | 12/2015 | Yamasaki | |
| 2016/0052295 A1 | 2/2016 | Legallais | |
| 2017/0172279 A1* | 6/2017 | Nagao | A45D 29/00 |
| 2017/0266983 A1 | 9/2017 | Irie | |
| 2017/0367459 A1 | 12/2017 | Yamasaki | |
| 2018/0272750 A1 | 9/2018 | Yamasaki | |
| 2018/0361736 A1* | 12/2018 | Irie | B41J 2/04586 |
| 2019/0090609 A1* | 3/2019 | Shimizu | A45D 29/00 |

FOREIGN PATENT DOCUMENTS

| | | | |
|---|---|---|---|
| CN | 100412904 C | 8/2008 | |
| CN | 102946513 A | 2/2013 | |
| CN | 104809288 A | 7/2015 | |
| CN | 205318361 U | 6/2016 | |
| CN | 106651902 A | 5/2017 | |
| CN | 107752319 A | 3/2018 | |
| CN | 207477132 U | 6/2018 | |
| CN | 108477809 A | 9/2018 | |
| CN | 108749338 A | 11/2018 | |
| CN | 108813899 A | 11/2018 | |
| CN | 108835837 A | 11/2018 | |
| CN | 108973354 A | 12/2018 | |
| CN | 208211709 U | 12/2018 | |
| CN | 109147001 A | 1/2019 | |
| CN | 109572239 A | 4/2019 | |
| CN | 109744703 A | 5/2019 | |
| CN | 109770520 A | 5/2019 | |
| CN | 109782975 A | 5/2019 | |
| CN | 209037206 U | 6/2019 | |
| CN | 110126480 A | 8/2019 | |
| JP | 2012135587 A | 7/2012 | |
| KR | 20030062494 A | 7/2003 | |
| KR | 20120015408 A | 2/2012 | |
| WO | 2013176316 A1 | 11/2013 | |

OTHER PUBLICATIONS

Written Opinion in PCT/CN2019/104696 dated Nov. 27, 2019, 5 pages.
The Extended European Search Report in European Application No. 19192323.4 dated Jun. 17, 2020, 9 pages.
First Office Action in Chinese Application No. 201910032978.9 dated May 28, 2020, 18 pages.
First Office Action in Chinese Application No. 201910033488.0 dated May 9, 2020, 19 pages.
Guan Xin et al., Adaptive Threshold Algorithm Based on Contrast-regional Homogeneity Analysis of Lane Image Journal of Jilin University(Engineering and Technology Edition), 38 (4): 758-763, 2008.
Notice of Reasons for Rejection in Japanese Application No. 2019-175815 dated Oct. 26, 2020, 6 pages.
First Office Action in Chinese Application No. 201910032943.5 dated Apr. 28, 2021, 12 pages.
First Office Action in Chinese Application No. 201910032951.X dated Mar. 30, 2021, 15 pages.

* cited by examiner

PRINTING METHOD AND SYSTEM OF A NAIL PRINTING APPARATUS, AND A MEDIUM THEREOF

CROSS-REFERENCE TO RELATED APPLICATIONS

This application claims priority to Chinese Patent Application No. 201910033488.0, filed on Jan. 14, 2019, Chinese Patent Application No. 201910032943.5, filed on Jan. 14, 2019, Chinese Patent Application No. 201910032951.X, filed on Jan. 14, 2019, Chinese Patent Application No. 201910032969.X, filed on Jan. 14, 2019, Chinese Patent Application No. 201910032978.9, filed on Jan. 14, 2019 and Chinese Patent Application No. 201920066496.0, filed on Jan. 14, 2019, the contents of which are hereby incorporated by reference in its entirety.

TECHNICAL FIELD

The present disclosure relates to a nail printing field, particularly to a printing method and system of a nail printing apparatus, and a medium thereof.

BACKGROUND

As living standards improve, more and more people are willing to dress themselves up. For example, many women choose to print various patterns on their nails. While a pattern is printed on the nail, a customer may use a nail printing apparatus to print the pattern. With a current printing method of the nail printing apparatus, it is complicated and/or inconvenient to select an image to print, and/or adjust the image, and it is slow and inefficient to print the pattern on the nail. Moreover, the printing pattern may be printed on the finger around the nail. Thus, after the pattern is printed, the finger around the nail needs to be cleaned, and the cleaning process is cumbersome. Each customer needs a long time period using the current printing method and the efficiency is relatively low.

In some cases, a current nail printing apparatus fails to determine whether a position of the nail is appropriate, and/or the nail swags. If the position of the nail is inappropriate, and/or the nail swags, a pattern printed on the nail swags, and the pattern fails to display on the nail perfectly, thereby affecting the printing effect and having a relatively bad user experience.

Therefore, it is required to provide a more efficient nail printing scheme for the prior art.

SUMMARY

The present disclosure may disclose a printing method, system, and medium of a nail printing apparatus to solve the technical problem that the efficiency of the prior printing method is low and the pattern is printed on the finger around the nail.

In a first aspect, the present disclosure may disclosure a printing method of a nail printing apparatus. The nail printing apparatus may include a touch screen. The touch screen may be configured to display a first interface. The first interface may include a second region. A printing method of the nail printing apparatus may include: displaying a user's nail model in the second region; displaying a first pattern in the second region. The user's nail model may overlap at least a portion of the first pattern, and the at least a portion of the first pattern overlapping the user's nail model may be a used as printing pattern; and printing the printing pattern based on a printing instruction.

In a second aspect, the present disclosure may disclosure a printing system of a nail printing apparatus. The nail printing apparatus may include a touch screen. The touch screen may be configured to display a first interface. The first interface may include a second region. The printing system of the nail printing apparatus may include: a model displaying module, configured to display a user's nail model in the second region; a pattern displaying module, configured to display a first pattern in the second region, wherein the user's nail model may overlap at least a portion of the first pattern, and the at least a portion of the first pattern overlapping the user's nail model may be a printing pattern; and a printing module, configured to print the printing pattern based on a printing instruction.

In a third aspect, the present disclosure may further provide a nail printing apparatus. The nail printing apparatus may include a storage, a processing device, and a computer program stored in the storage and operated in the processing device. The processing device may implement the printing method of the nail printing apparatus in the first aspect according to the present disclosure during executing the program.

In a fourth aspect, the present disclosure may further provide a computer readable medium having a computer program stored thereon. The program may be executed by the processing device to implement the printing method of the nail printing apparatus provided by the first aspect of the disclosure.

Compared with the prior art, the present disclosure may provide a printing method and system of a nail printing apparatus, and a medium thereof. A portion of a pattern overlapping a user's nail model may be used as printing pattern. Only the portion of the pattern overlapping the user's nail model may be printed during the printing, thereby reducing the pattern to be printed, saving ink, prolonging a usage time of an ink cartridge, and helping reduce costs. The pattern other than the user's nail model may be not printed. After the printing is completed, no ink may be sprayed on fingers around the nails, and it may be unnecessary to use an anti-overflow glue on the fingers around the nail, which may not only save the cost, but also reduce two processes of coating the anti-overflow glue before the printing and cleaning the anti-overflow glue after the printing and improve the nail printing efficiency.

The present disclosure may provide a nail printing apparatus to solve the technical problem that an existing touch screen does not perform well when displaying a contour of a user's nail.

The present disclosure may provide a nail printing apparatus, and the nail printing apparatus may include a control module, a camera device and a touch screen. The camera device and the touch screen may be electrically connected to the control module. The camera device may be configured to take a photo or a video of a user's finger. The touch screen may be configured to display a user's finger image captured by the camera device in real-time and highlight a user's nail model corresponding to a contour of the nail in the user's finger image.

Preferably, the nail printing apparatus may include a printing device. The printing device and the control module may be electrically connected. The touch screen may be further configured to display a second pattern for the user to select for printing. The control module may be configured to identify the contour of the nail in the user's finger image.

The control module may be further configured to control the printing device to print a pattern within the contour of the nail according to the second pattern selected by a user.

Preferably, the pattern printed on the contour of the nail may coincide with a portion or a whole of the second pattern.

Preferably, the touch screen may be configured to display a first interface, and the first interface may include a third region and a second region. The third region may be configured to display a plurality of second patterns and a second pattern selected and touched by the user from the plurality of second patterns. The second region may be configured to display the user's nail model 122 and the first pattern 121, and a position and/or size of the first pattern 121 may be adjusted by the user. The at least a portion of the first pattern overlapping the user's nail model may be used as a printing pattern. The first pattern may coincide with the selected second pattern.

Preferably, the first interface may include a first region, and the first region may be configured to display an effect print image that the first pattern matches the user's nail model. The third region, the second region, and the first region may be successively arranged from right to left on the touch screen.

Preferably, the first interface may further include a fourth region, and the fourth region may be configured to display an operation icon and for the user to touch the operation icon to perform a corresponding operation.

Preferably, the touch screen may be used for the user's touch operation to adjust the position of the first pattern and/or proportionally zoom in or out the size of the first pattern.

Preferably, when the second region initially displays the first pattern, a center of the first pattern may overlap a center of the user's nail model.

Preferably, the nail printing apparatus may include a fingerprint identification module. The fingerprint identification module and the control module may be electrically connected. The fingerprint identification module may be configured to identify a fingerprint to unlock the nail printing apparatus.

Preferably, the nail printing apparatus may further include a wireless transmission module. The wireless transmission module and the control module may be electrically connected. The wireless transmission module may be configured to communicate with an external intelligent terminal by wireless connection.

Compared with the prior art, the embodiments of the present disclosure may provide a nail printing apparatus. The nail printing apparatus may include a control module, a camera device and a touch screen. The camera device and the touch screen may be electrically connected to the control module. The camera device may be configured to take a photo or a video of a user's finger. The touch screen may be configured to display a user's finger image captured by the camera device in real-time and highlight a contour of the nail in the user's finger image. The touch screen may highlight the contour of the user's nail in real-time so that the user may clearly see the contour of the user. When the user's nail is skewed, the user may visually see and adjust it. The user experience may be good, the pattern printing effect may be improved and, and displayed in real-time. The contour of the nail may move along when the user's finger moves, and the dynamic effect may be good.

The control module may be further configured to control the printing device to print a pattern within the contour of the nail according to the second pattern selected by the user. The skin outside the contour of the user's nail may be not printed, thereby saving printing materials and a printing time. In the current market, the nail printing apparatus may need to coat an isolation glue around the nail before the nail printing to prevent the ink from being sprayed on the finger around the nail during printing the pattern. The isolation glue may be cleaned after the printing is completed. The nail printing apparatus provided by this embodiment may only print within the contour of the nail, and the ink may be not sprayed onto the finger, the isolation glue may be not coated in advance, and it may not need to clean the isolation glue after the printing, thereby reducing the nail printing steps, saving the nail printing time, and improving the efficiency of the nail printing.

The present disclosure may provide a printing method of a nail printing apparatus to solve a problem of not facilitating to select and adjust an image.

The present disclosure may provide a printing method of a nail printing apparatus, and the nail printing apparatus may include a touch screen. The touch screen may be configured to display a first interface. The first interface may include a third region and a second region. The third region may include a plurality of second patterns. The printing method of a nail printing apparatus may include: selecting one of the second patterns in the third region by the user, and displaying a first pattern in the second region according to the second pattern, wherein the first pattern overlaps a user's nail model pre-displayed in the second region; adjusting a position and a size of the overlap between the first pattern and the user's nail model; and clicking a predetermined printing pattern by the user so as to print a pattern of the overlap between the first pattern and the user's nail model on the user's nail.

Compared with the prior art, the present disclosure may provide a printing method of a nail printing apparatus. By identifying a contour of a nail in a nail image and displaying a user's nail model corresponding to the contour of a nail; selecting a pattern from a predetermined image library, and generating a pattern to be printed, wherein the pattern to be printed overlaps the user's nail model; adjusting the pattern to be printed; and printing the adjusted pattern to be printed on a target nail. A pattern may be selected and printed on the target nail quickly, and after the pattern is selected, the pattern may be adjusted to obtain a size or a position of expected effect.

DETAILED DESCRIPTION

Figure 1A:
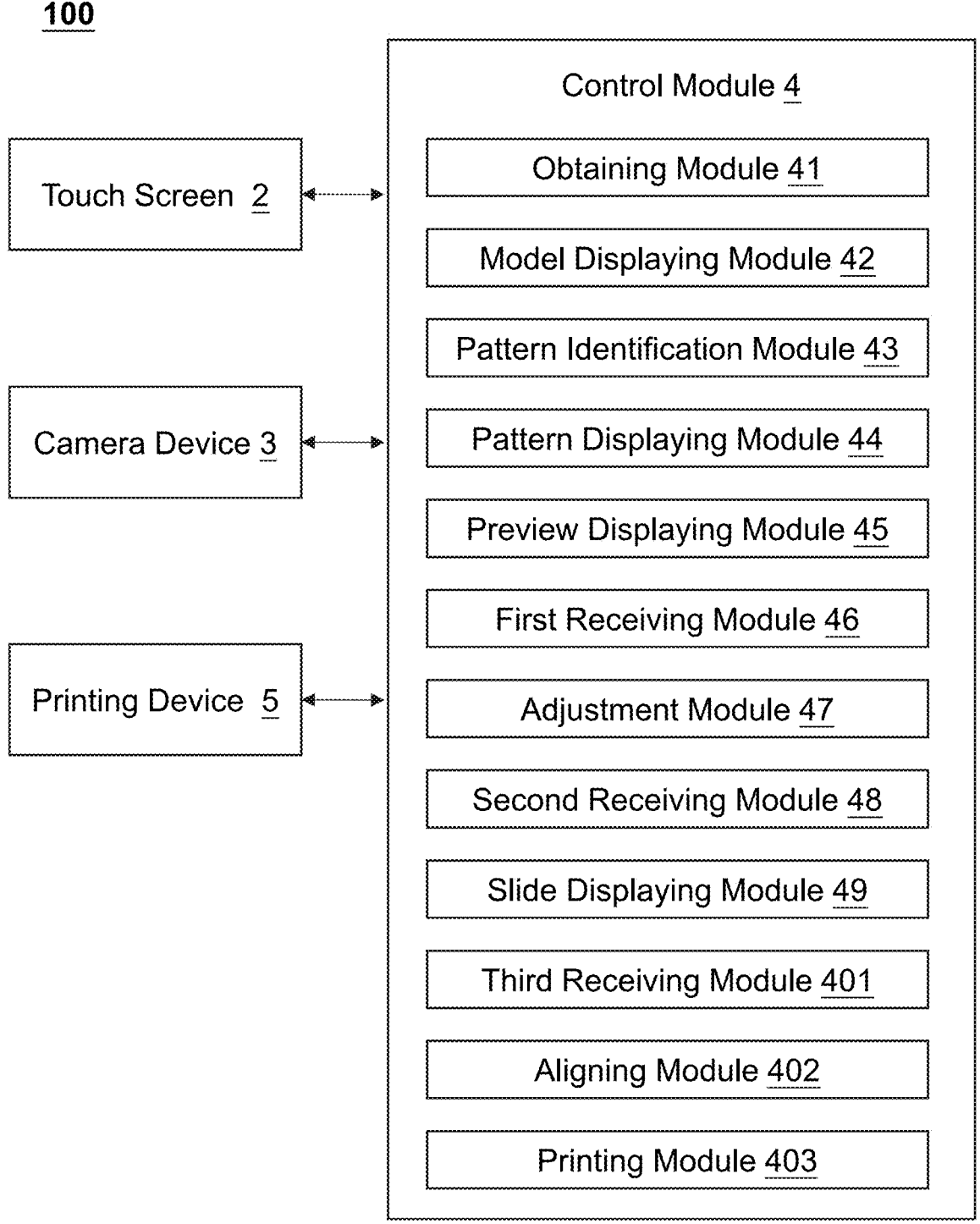
FIG. 1A is a structural diagram illustrating a nail printing apparatus according to a first embodiment of the present disclosure.

The present disclosure will be described in detail with reference to specific embodiments and drawings. It should be understood that the specific embodiments described herein are merely illustrative of the present disclosure, rather than the limitation of the present disclosure. It should also be noted that, for ease of description, only part, but not all, of the structures associated with the present disclosure are shown in the drawings.

It should be mentioned before discussing the exemplary embodiments in detail that some exemplary embodiments are described as processes or methods depicted as flowcharts. Although the flowcharts describe each step as a sequential process, many of the steps may be implemented in parallel, concurrently, or simultaneously. Besides, each the sequence of the steps may be rearranged. The process may be terminated when its operation is completed, but may also have an additional step not included in the drawing. The process may correspond to a method, a function, a procedure, a subroutine, a subroutine, and the like.

In addition, the terms "first," "second," or the like may be used herein to describe various directions, acts, steps or elements, etc., but such orientations, acts, steps or elements are not limited by these terms. These terms may be only configured to separate the first direction, motion, step, or component from another direction, motion, step, or component. For example, a first speed difference may be a second speed difference without departing from the scope of the present disclosure, and similarly, the second speed difference may be referred to as the first speed difference. Both the first speed difference and the second speed difference may be speed differences, but they are not the same speed difference. The terms "first," "second," etc., may be not to be construed as indicating or implying a relative importance or implicitly indicating the number of technical features indicated. Thus, a feature defining "first" or "second" may explicitly or implicitly include one or more of the feature. In the description of the present disclosure, "a plurality of" means at least two, for example, two, three, etc., unless specifically defined otherwise.

Figure 1B:
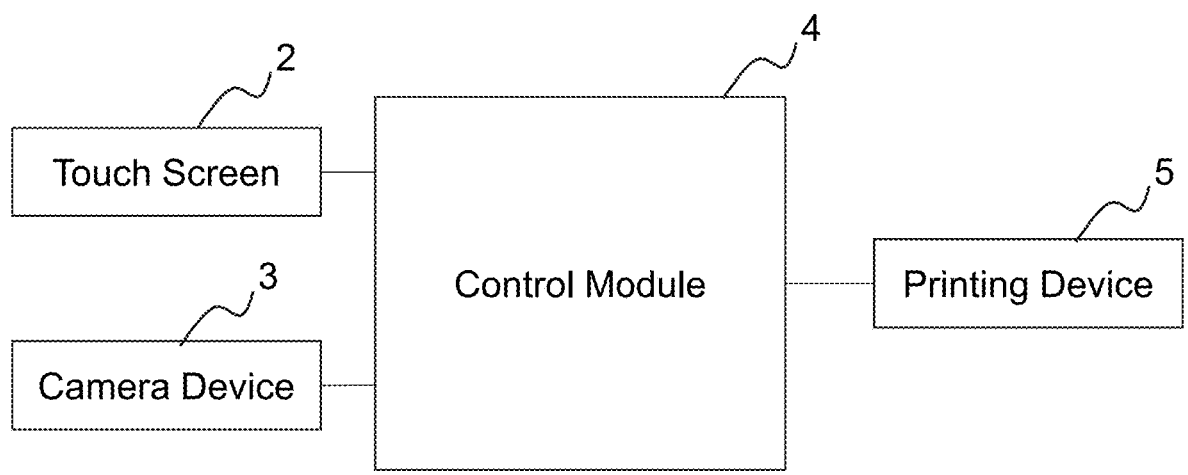
FIG. 1B is a structural diagram illustrating a nail printing apparatus according to a first embodiment of the present disclosure.

Referring to FIG. 1 or 1B, a first embodiment of the present disclosure may provide a nail printing apparatus 1. The nail printing apparatus 1 may include a touch screen 2, a nail holder (not shown), a camera device 3, a control module 4, and a printing device 5. The touch screen 2, the camera device 3, and the printing device 5 may be electrically connected to the control module 4. The nail holder may be configured to hold a nail of a user (also referred to as "user's nail") or a finger of the user (also referred to as "user's finger"). The camera device 3 may take a photo of the user's finger. The control module 4 may determine a position, a shape, a size of the nail and/or a contour of the nail (also referred to as "nail contour") based on a video or the photo of the user's finger taken by the camera device 3. The touch screen may be configured to implement a touch operation of the user to print a pattern on the user's nail using the printing device 5, such as printing within the nail contour.

The camera device 3 may capture the user's finger, and the capturing may be an image of the user's nail (also referred to as "picture of the user's finger"). The camera device 3 may be a camera. For example, the type of the camera may be not limited to a digital camera, an analog camera, a color camera or a grayscale camera.

The control module 4 may be configured to control operations of various modules or devices connected thereto. The control module 4 may be a control chip or an integrated device such as an industrial computer.

Figure 2:
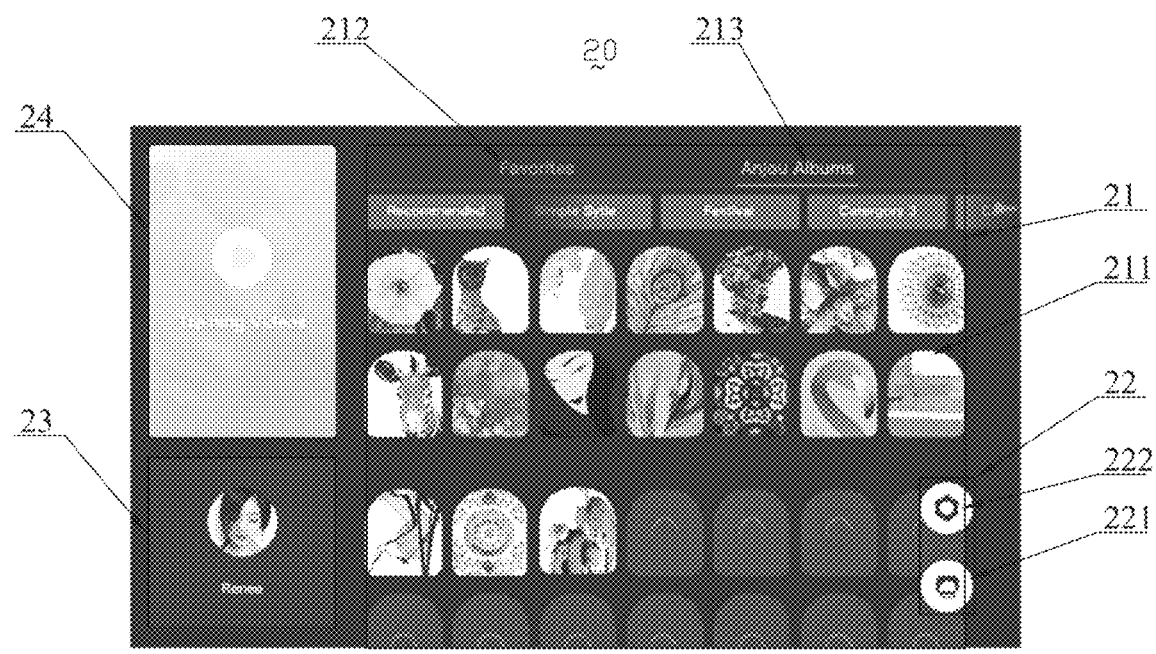
FIG. 2 is a schematic diagram illustrating a first interface of a touch screen according to a first embodiment of the present disclosure.
Figure 3:
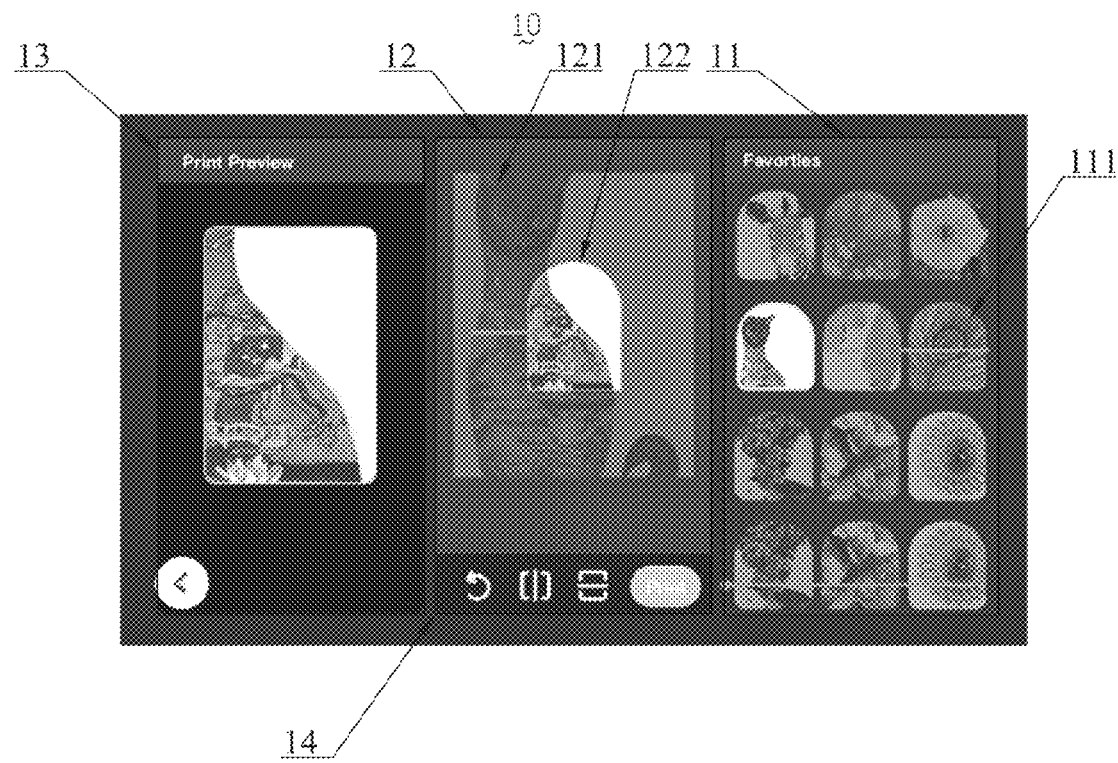
FIG. 3 is a schematic diagram illustrating a second interface of a touch screen according to a first embodiment of the present disclosure.

Referring to FIG. 2 and FIG. 3, the touch screen 2 may be also configured to display different operation interfaces. In this embodiment, the touch screen 2 may be configured to display a first interface 10 and a second interface 20. The first interface 10 may be accessed by operating the second interface 20. The second interface 20 may be used as a boot interface of the nail printing apparatus 1. The second interface 20 may include a plurality of function regions to access different function interfaces. The first interface 10 may be a printing interface. The touch screen 2 may have a structure of a regular touch screen. Specifically, the touch screen 2 may include a display screen and a touch screen. The touch screen may be placed on an upper side of the display, and the touch screen may have touching and displaying functions. It should be understood that in an embodiment that only needs to display the touch screen 2 and does not need to touch the touch screen 2 among the embodiments of the present disclosure, the touch screen 2 may be replaced by the display screen.

The second interface 20 may include a fifth region 21, a sixth region 22, a seventh region 23, and an eighth region 24. The fifth region 21, the sixth region 22, the seventh region 23, and the eighth region 24 may partially overlap, or may be different display regions. In this embodiment, the fifth region 21, the seventh region 23, and the eighth region 24 may be different display regions. Portions of the fifth region 21 and the sixth region 22 may overlap each other. The sixth region 22 may be placed on an upper layer of the fifth region 21.

The seventh region 23 may be used for displaying account management information and inputting account information by a touch of the user (also referred to as "user's touch"). If the user clicks a user login icon in the seventh region 23, the user may log in his/her account. When the user does not have an account, the user may also apply for registering his/her account by clicking an account registration icon in the seventh region 23. Of course, in some embodiments, in a registration option of a (Quick Response) QR code in the seventh region 23, the user may synchronously log in the nail printing apparatus 1 and a mobile account by scanning the QR code via a mobile terminal. The synchronization of the mobile terminal and the nail printing apparatus 1 may realize resource synchronization and improve convenience for usage.

The eighth region 24 may be used for the user to select a video for playing, and perform a touch operation on the played video. The video may include an advertisement, a nail printing tutorial, etc. The touch operation may include an operation of playing a video, turning off a video, dragging a playing time, etc., and not enumerate here. In some embodiments, the eighth region 24 may be used for the user to operate a nail printing tutorial video and play it. By clicking the eighth region 24, the user may view the use tutorial of the nail printing apparatus 1 to understand how the nail printing apparatus 1 operates.

The fifth region 21 may include different image catalogues. The different image catalogues may include different third patterns 211, and also include a same portion of the third patterns 211, i.e., the fifth region 21 may be configured to display the different image catalogues and the third patterns 211 under the selected image catalogues, and a third pattern 211 selected by the user's touch. The selected third pattern 211 may be printed on the user's nail. When the user clicks the third pattern 211, the third pattern 211 may be selected. In some embodiments, after selecting the third pattern 211, the third pattern 211 may be suspended, amplified and displayed in a set position (for example, a middle position of the touch screen), and the user may slide the amplified and displayed third pattern 211 to the left, the right, an upper side or a lower side. The third pattern 211 may be slid a pattern position to a corresponding side and reduced to a set size. The third pattern 211 at an adjacent position on the left side, right side, the upper side or the lower side may be slid to the aforementioned set position and displayed amplifiedly. A selection icon may be displayed on the circumferential side of the amplified third display pattern 211. For example, a five-positioned star icon may be placed at a position below the third pattern 211. When the user clicks the five-positioned star icon, the third pattern 211 may enter into a specified image catalogue. The five-positioned star icon may be only an example, and not used as a limitation to the technical solution, and other shapes of icons may also be used in other embodiments. In this embodiment, the image catalogue may include at least a second pattern catalogue 212 and a first pattern catalogue 213. The second pattern catalogue 212 may be configured to store the third pattern 211 selected by the user from the first pattern catalogue 213. The first pattern catalogue 213 may be configured to store a third pattern 211 designed by an operator or a third pattern 211 uploaded by a third party. In some embodiments, the second pattern catalogue 212 may be a favorite pattern catalogue. The first pattern catalogue 213 may be an operator pattern catalogue. The second pattern catalogue 212 may be favorite patterns of the user, and the patterns in this catalogue may be selected and added by the user. For example, you may add them from the first pattern catalogue 213, or download them from the web. The second pattern catalogue 212 may be associated with an account of the user (also referred to as "user's count"). Logging into different accounts, different third patterns 211 may be set in the second pattern catalogue 212. When the touch screen 2 receives an instruction of displaying image patterns of the user, patterns corresponding to the instruction of displaying image patterns may be displayed in the fifth region 21. Specifically, the instruction of displaying image patterns may be clicking a pattern catalogue under the image catalogues of the user. If the user clicks the operator pattern catalogue in the image catalogues in the fifth region 21 of the touch screen, the third patterns 211 corresponding to the operator pattern catalogue may be displayed in the fifth region 21. It should be understood that the image catalogues may also include a plurality of small sub catalogues. The sub catalogues of the images may include at least one corresponding third pattern 211. Specifically, the operator pattern catalogue may include a cartoon catalogue, a game catalogue, a landscape catalogue, and an animal catalogue. The cartoon catalogue may include patterns of characters in cartoons or anime. The game catalogue may include patterns of game characters. The landscape catalogue may include patterns of beautiful landscapes. The animal catalogue may include different animal patterns. When the touch screen 2 receives an adding instruction of the user, the third pattern 211 corresponding to the adding instruction and the first pattern catalogue 213 may be added to the second pattern catalogue 212. Specifically, the adding instruction may be pressing the third pattern 211 in a pattern catalogue selected by the user. When the user presses the third pattern 211 for a long time, the long-pressed third pattern 211 may be added to the second pattern catalogue 212. The "long-pressed" may be defined as pressing for more than 2 s. The user may choose their favorite patterns through the fifth region 21 to print them on their nails. The classification of the images may help users quickly locate a catalogue of interest of the third patterns 211, and the third pattern 211 may be selected more conveniently and quickly. Adding the third pattern 211 to a target catalogue by clicking the third icon or long-pressing the selected third pattern 211 may make the operation smarter.

The sixth region 22 may be used for displaying an operation icon, and for the user to touch the operation icon to enter a corresponding operation interface. In the present embodiment, the sixth region 22 may include a painted printing icon 221 and a system setting icon 222. The sixth region 22 may be configured to display the painted printing icon 221 and the system setting icon 222. The painted printing icon 221 and the system setting icon 222 may both be floating icons. The user may drag the painted printing icon 221 and the system setting icon 222 to change positions of the painted printing icon 221 and the system setting icon in the second interface 20. It should be understood that the positions of the painted printing icon 221 and the system setting icon 222 may be not limited, and the positions of the painted printing icon 221 and the system setting icon 222 may be freely dragged.

When the user clicks the system setting icon 222, the user may enter the system setting interface, and the user may set an operating system of the nail printing apparatus 1. When clicking the third pattern 211, the user may click and touch the painted printing icon 221 to enter the first interface 10 from the second interface 20 to perform a corresponding operation, and finally print the selected third pattern 211 on the user's nail. It should be understood that when clicking the painted printing icon 221, the user may enter the first interface 10 from the second interface 20, and select the third pattern 211 for printing by operating the first interface 10.

Referring to FIG. 3, the first interface 10 may include a third region 11, a second region 12, a first region 13, and a fourth region 14. The third region 11, the second region 12, the first region 13, and the fourth region 14 may partially overlap, or may be different regions. In this embodiment, the third region 11, the second region 12, the first region 13, and the fourth region 14 may be different display regions. The third region 11, the second region 12, and the first region 13 may be successively arranged from right to left on the display interface of the touch screen 2.

The third region 11 may be configured to display a plurality of second patterns 111 and a second pattern 111 selected and touched by the user from the plurality of second patterns 111. A mode of the touch may be common, e.g., single clicking, double clicking or dragging. The second pattern 111 may correspond to the third pattern 211 under the second pattern catalogue 212 in the second interface 20. The second pattern 111 displayed in the third region 11 may be the same as the third pattern 211 of the second pattern catalogue 212 in the second interface 20. When the second pattern 111 is too large, and the third region 11 fails to display the whole second pattern 111, the user may slide the touch screen, such as sliding the third region of the touch screen to display other portion of the second pattern 111, or click the second pattern 111 to slide to a specific direction. The specific direction may be up, down, left or right. It may be very convenient to view the other portion of the second pattern 111 by touching the touch screen 2 and the sliding.

The second region 12 may be configured to display the user's nail model 122 and the first pattern 121. A position and/or size of the first pattern 121 may be adjusted by the user. The first pattern 121 may coincide with the selected second pattern. When the user clicks the second pattern 121 in the third region 11, the first pattern 121 corresponding to the second pattern 111 may be displayed in the second region 12. The user's nail model 122 may be an image of a region (also referred to as "region image") of the nail identified by the control module 4 based on the video or photo of the user's finger taken by the camera device 3. The user's nail model 122 may correspond to the user's nail. In some embodiments, the second region may display the user's nail model 122 corresponding to the user's finger image in real-time. In some embodiments, the camera device 3 may take the user's finger image of the user's finger, and the control module may identify a contour of the nail based on the user's finger image. When the user moves the nail on the nail holder, the user's nail model 122 may also move as the user's nail moves. In the second region 12, the user's nail model 122 may be displayed to facilitate the user to check whether the nail is placed is in a correct position, or whether the nail is skewed so as to adjust the nail to a standard placement before the printing, which may have better visibility, good user experience, better print quality and user satisfaction. Preferably, the second region 12 may also display an image of the user's finger taken by the camera device 3 in real-time. Preferably, when the user's nail model 122 is displayed, the user's nail model 122 may be highlighted, and the user's nail model may be more clear or brighter than the color or pattern around the user's nail model. Specifically, when the nail is coated with white or other high-brightness base glue, which may be then identified by the control module 4, and finally displayed on the touch screen in real-time. An effect of the user's nail model 122 corresponding to the user's nail may look "brighter" than other regions. Of course, it may be also possible for the processing device to perform brightness compensation on the identified user's nail model to highlight it, or a background color of the region other than the user's nail model in the second region may be dark black. In the second region, the user's nail model 122 may be displayed to facilitate for the user to check whether the nail placement is correct, or whether the nail is skewed so as to adjust the nail to a standard placement before the printing, which may have better visibility, good user experience, better print quality and user satisfaction. It should be understood that when initially displayed, the first pattern 121 may be the same size as the second pattern 111, or may not coincide with the size of the second pattern 111. The position and/or size of the first pattern 121 may be subsequently changed by the user. Specifically, the user may change the size of the first pattern 121 by using a multi-touch method on the touch screen 2. If the user touches two different positions of the first pattern 121 in the second region 12 with two fingers, the size of the first pattern 121 may be adjusted by sliding the two fingers in the second region 12 and adjusting a distance between the two fingers. When the distance between the two fingers increases, the first pattern 121 may be zoomed out. When the distance between the two fingers decreases, the first pattern 121 may be zoomed in. The first pattern 121 may be easily and quickly operated by the touch method, and the first pattern 121 may be not skewed, and the adjustment effect may be better, which may be advantageous for improving the printing effect and the user satisfaction. The touch screen 2 may be operated by the user to change the position of the first pattern 121. For example, the user may touch the first pattern 121 in the second region 12 by one finger, and the position of the first pattern 121 may be changed by sliding the finger in the second region 12. When the size and position of the first pattern 121 are changed, the user's finger required to print the pattern may not move on the nail holder, and the user's nail model 122 of the second region 12 may not move. The user's nail model 122 and the first pattern 121 may partially overlap. The overlapped pattern of the first pattern 121 and the user's nail model 122 may be used as a printing pattern, i.e., a pattern printed on a contour of the user's nail. The printing pattern may be a portion of the pattern or a whole of the first pattern 121, i.e., the pattern printed on the contour of the nail may coincide with the portion or the whole of the second pattern 111. The touch screen 2 may be also configured to display the second pattern 111 for the user to select for the printing. The control module 4 may identify the contour of the nail in the image of the user's finger. The control module 4 may control the printing device 5 to print the pattern within the contour of the nail according to the second pattern 111 selected by the user. The pattern printed on the contour of the nail may be the portion or the whole of the second pattern 111. In some other embodiments, an area of the region of the pattern on the contour of the nail may be 90%-99% of an area of the region of the contour of the nail. The area of the region of the pattern on the contour of the nail may be less than the size of the nail so that an edge of the user's nail edge may have no pattern. When the user uses the finger, the pattern may be not damaged and may maintain good appearance. The overlapped pattern of the first pattern 121 and the user's nail model 122 may be used as the printing pattern, which may be advantageous for saving printing ink and reducing cost. It may be unnecessary to coat an isolation glue on the finger around the nail, since the finger around the user's nail may unlikely be printed, which may save a cleaning step after the printing and improve the nail printing efficiency. In some other embodiments, the user may touch different positions of the first pattern 121 in the second region 12 with two fingers, and slide the two fingers synchronously, and the distance between the two fingers may not change, and the position of the first pattern 121 may follow the finger accordingly. Alternatively, when the touch screen initially displays the first pattern 121, the center of the first pattern 121 may overlap the center of the user's nail model 122. The center in this embodiment may be a geometric center or a geometric center of gravity, and not specifically limited herein. For a regular pattern, the geometric center may overlap the geometric center of gravity.

The first region 13 may be configured to display a print effect image that the first pattern 121 matches the user's nail model 122. The print effect image that the first pattern 121 matches the user's nail model 122 may be determining a portion of the first pattern 121 that matches a shape and the size of the user's nail model 122, fitting thereof with the user's nail model and then displaying thereof in the first region 13. Therefore, the user may preview the effect of printing the printing pattern on his/her nail in the first region 13 thereby facilitating the user to select the favorite pattern and adjust the pattern to the best printing effect, which is highly practical.

The fourth region 14 may be configured to display the operation icon and for the user to touch the operation icon to perform the corresponding operation. Specifically, the operation icon may include the rotation icon, the horizontal mirroring icon, the vertical mirroring icon, and the printing icon. When the user's touches the rotation icon, the first pattern 121 may be rotated. When the user's touches the vertical mirroring icon, the first pattern 121 may implement vertical mirroring. When the user's touches the printing icon, the pattern may be printed on the user's nail. It may be convenient for the user to quickly adjust the first pattern to improve printing efficiency by setting common shortcuts (e.g., in the fourth region) for image adjustment, which may be easy to operate, and efficient.

In some embodiments, the second region 12 may be configured to display the user's nail model 122 in real-time in the first time period; display the effect image of the overlap between the user's nail model 122 and the first pattern 121 in real-time in the second time period; when the first pattern 121 is adjusted by the user, display the effect image of the overlap between the user's nail model 122 and the adjusted first pattern 121 in real-time, i.e., when the user adjusts the first pattern 121, the touch screen 2 may display it in real-time; and display a printing process of printing the pattern of the overlap between the first pattern 121 and the user's nail model 122 in a third time period. The printing process may begin from printing a first pixel on the nail to completing the printing. The actual printing condition may be displayed in real-time, or may simulate a printing process of the first pattern 121 in the user's nail model 122 according to printing parameters corresponding to the first pattern 121 to be printed. The simulation printing process may be synchronized with the actual printing. The first time period may begin from placing the finger in the nail holder within a shooting range of the camera device 3, to a time before displaying the first pattern 121 in the second region 12. The second time period may begin from displaying the first pattern 121 in the second region 12, to a time before printing, i.e., clicking the printing icon. The third time period may begin from clicking the printing icon to completely printing the overlap of the first pattern 121 and the user's nail model 122. The second region 12 may set different display and/or touch modes in different time periods, and the content displayed in different time periods may change according to the printing process so that the user may observe the current state of the nail at each stage, and the user experience may be better.

In summary, the nail printing apparatus provided by the present disclosure embodiment may divide different regions on the touch screen. The third region 11 may be configured to display a plurality of second patterns 111 and a second pattern 111 selected and touched by the user from the plurality of patterns 111. The second region 12 may be configured to display the user's nail model 122 and the first pattern 121. The position and size of the first pattern 121 may be adjusted by the user, which may make the interface displayed on the touch screen 2 simple. The user may touch the second pattern 111 of interest directly, and the first pattern 121 corresponding to the selected second pattern 111 may be displayed in the second region 12. The user operation may be simple, and the pattern desired to be printed on the nail may be quickly selected. Moreover, the user's nail model 122 may be displayed in the second region 12, and the user may determine whether it is necessary to adjust a front, rear, left and right position or an angle of the nail according to the current condition of the user's nail model 122, thereby improving the user experience. The matching effect of the adjusted first pattern and the user's nail model 122 may allow the user to visually preview the printing pattern on his/her own nail, and help improve the printing quality, and enhance customer satisfaction.

Continuing to refer to FIG. 1, the control module 4 may include an obtaining module 41. The obtaining module 41 may be configured to obtain a region image or an image of the user's nail, and obtain the region image or the image of the user's nail by controlling the camera device 3.

The control module 4 may include a model displaying module 42. The model displaying module 42 may be configured to display the user's nail model 122 corresponding to the region image or the image of the nail in the second region 12 in real-time.

The control module 4 may include a pattern identification module 43. The pattern identification module 43 may be configured to identify the second pattern 111 selected by the user in the third region 11.

The control module 4 may include a pattern displaying module 44. The pattern displaying module 44 may be configured to display the first pattern 121 in the second region 12. An image of the first pattern 121 may coincide with an image of the selected second pattern 111. The user's nail model 122 and the first pattern 121 may partially overlap. In some embodiments, a center of the first pattern 121 may overlap a center of the user's nail model 122. In some embodiments, a portion of the first pattern 121 overlapped the user's nail model 122 may be a printing pattern.

The control module 4 may include a preview displaying module 45. The preview displaying module 45 may be configured to display an effect print preview that the printing pattern is printed on the user's nail in the first region 13, e.g., in real-time.

The control module 4 may include a first receiving module 46. The first receiving module 46 may be configured to receive an adjustment instruction of adjusting a position and/or a size of the first pattern 121 via the touch screen.

The control module 4 may include an adjustment module 47. The adjustment may be configured to adjust the position and/or the size of the first pattern 121 according to the adjustment instruction of adjusting the printing pattern.

The control module 4 may include a printing module 403. The printing module 403 may be configured to print the printing pattern according to a printing instruction.

In some embodiments, the control module 4 may further include a second receiving module 48. The second receiving module 48 may be configured to receive a slide instruction.

In some embodiments, the control module 4 may further include a slide displaying module 49. The slide displaying module 49 may be configured to display a plurality of second patterns 111 in the third region 11 after sliding according to the slide instruction.

In some embodiments, the control module 4 may further include a third receiving module 401. The third receiving module 401 may be configured to receive a center alignment instruction.

In some embodiments, the control module 4 may further include an aligning module 402. The aligning module 402 may be configured to overlap the position of the first pattern 121 corresponding to the center alignment instruction and the center of the user's nail model 122 according to the center alignment instruction.

In some embodiments, the obtaining module 41 may include a nail image obtaining module. The nail image obtaining module may be configured to obtain an image of the user's nail (also referred to as "user's nail image").

The obtaining module 41 may include a nail region image obtaining module. The nail region image obtaining module may identify a region image of the nail (also referred to as "nail region image") according to the image of the user's nail.

The nail region image obtaining module may include a grayscale processing module. The grayscale processing module may be configured to perform grayscale processing on the image of the user's nail to obtain a grayscale image of the user's nail.

The nail region image obtaining module may include an average grayscale value obtaining module. The average grayscale value obtaining module may configure to calculate an average grayscale value of the grayscale image of the user's nail.

The nail region image obtaining module may include a difference calculation module. The difference calculation module may be configured to obtain a difference of average grayscale values between the average grayscale value of the grayscale image of the user and an average grayscale value of the predetermined background image.

The nail region image obtaining module may include a color obtaining module. The color obtaining module may be configured to obtain a first color and a second color from the user's nail image when the difference of average grayscale values is greater than a predetermined difference threshold of the grayscale values.

The nail region image obtaining module may include a contrast ratio obtaining module. The contrast ratio obtaining module may be configured to obtain a contrast ratio between the first color and the second color.

The nail region image obtaining module may include a comparison module. The comparison module may be configured to compare the contrast ratio with a predetermined contrast ratio threshold.

The nail region image obtaining module may include a target image obtaining module. The target image obtaining module may be configured to initiate a predetermined nail segmentation algorithm to obtain the region image of the nail if the contrast ratio is greater than the predetermined contrast ratio threshold.

In some embodiments, the obtaining module may include a finger image obtaining module. The finger image obtaining module may be configured to obtain an image of the user's finger.

The obtaining module may include a nail image obtaining module. The nail image obtaining module may be configured to obtain a nail image according to the user's finger image.

The nail image module may include a grayscale processing module. The grayscale processing module may be configured to perform grayscale on the finger image.

The nail image module may include a color obtaining module. The color obtaining module may be configured to obtain a first color and a second color.

The nail image module may include a contrast ratio obtaining module. The contrast ratio obtaining module may be configured to obtain a contrast ratio between the first color and the second color.

The nail image obtaining module may include a comparison module. The comparison module may be configured to compare the contrast ratio with a predetermined contrast ratio threshold.

The nail image obtaining module may include a target image obtaining module. The target image obtaining module may be configured to initiate a predetermined nail segmentation algorithm to obtain the image of the nail if the contrast ratio is greater than the predetermined contrast ratio threshold.

The pattern identification module 43 may include a first coordinate obtaining module. The first coordinate obtaining module may be configured to obtain a touch coordinate of the user in the third region 11.

The pattern identification module 43 may include a pattern obtaining module. The pattern obtaining module may be configured to identify the second pattern 111 corresponding to the touch coordinate 11.

The pattern displaying module 44 may include a second coordinate obtaining module. The pattern displaying module 44 may be configured to obtain coordinates of the second region 12.

The pattern displaying module 44 may include a first pattern displaying module. The first pattern displaying module may be configured to display an image of the second pattern 111 corresponding to the touch coordinate as the first pattern 121 in the second region 12 such that the user's nail model 122 and the first pattern 121 may partially overlap.

The function of each module included in the control module 4 may be explained in the subsequent embodiments.

The first embodiment of the present disclosure may disclosure a nail printing apparatus 1. By dividing different regions on the touch screen 2, an interface displayed on the touch screen 2 may be simple for the user to operate. The user may select a pattern to be printed on the nail quickly. A portion of the pattern may be selected for the printing, and the user may visually preview the pattern printed on the nail.

It should be understood that the nail printing apparatus of the first embodiment of the present disclosure may be supplemented and illustrated as a subsequent embodiment.

Comparing to the prior art, the present disclosure may provide a nail printing apparatus. The nail printing apparatus may include a control module, a camera device and a touch screen. The camera device and the touch screen may be electrically connected to the control module. The camera device may be configured to take a photo or a video of a user's finger. The touch screen may be configured to display a user's finger image captured by the camera device in real-time and highlight a contour of the nail in the user's finger image. The touch screen may highlight the contour of the user's nail in real-time so that the user may clearly see the contour of the user. By observing the contour of the finger, a placement position of the finger and a flatness of the nail may be facilitated to adjust, thereby improving the printing effect. The printing effect may be displayed in real-time, the contour of the nail may move along when the user's finger moves, and the dynamic effect may be good.

The control module of the present disclosure may be further configured to control the printing device to print a pattern within the contour of the nail according to the second pattern selected by the user. The skin outside the contour of the user's nail thus may be not printed, thereby saving printing materials and a printing time. In the current market, the nail printing apparatus may need to coat an isolation glue around the nail before the nail printing to prevent the ink from being sprayed on the finger around the nail during printing the pattern. The isolation glue may have to be cleaned after the printing is completed. The nail printing apparatus provided by this embodiment may print only within the contour of the nail, and thus, the ink is less likely to be sprayed onto the finger, the isolation glue may be not needed to be coated in advance, and to be cleaned after the printing, thereby reducing the nail printing steps, saving the time for nail printing, and improving the efficiency of the nail printing.

Figure 4:
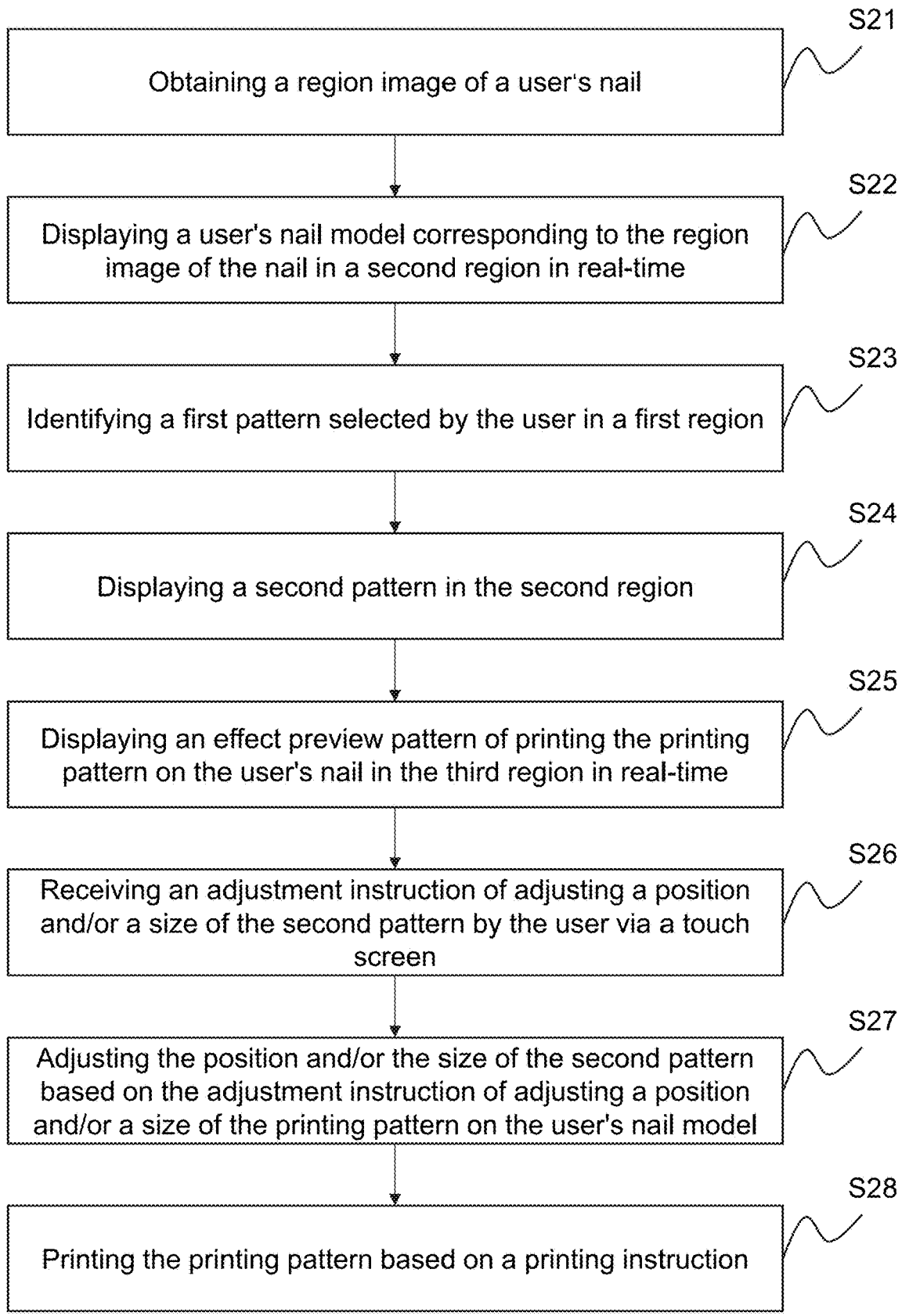
FIG. 4 is a flowchart illustrating a nail printing method according to a second embodiment of the present disclosure.

Referring to FIG. 4, a second embodiment of the present disclosure may provide a nail printing method based on the foregoing embodiment. The nail printing method may be executed by the control module. The nail printing method may be implemented by means of hardware and/or softwares and usually integrated in the nail printing apparatus. The nail printing apparatus in the first embodiment of the present disclosure may print the user's nail. The nail printing method may include:

S21: obtaining a region image of a user's nail;

S22: displaying a user's nail model corresponding to the region image of the nail in a second region in real-time;

S23: identifying a second pattern selected by the user in a third region;

S24: displaying a first pattern in the second region, wherein the first pattern may coincide with the second pattern, the user's nail model may overlap at least a portion of the first pattern, a center of the first pattern may overlap a center of the user's nail model, and the at least a portion of the first pattern overlapping the user's nail model may be used as a printing pattern;

S25: displaying an effect print preview of printing the printing pattern on the user's nail in the first region in real-time;

S26: receiving an adjustment instruction of adjusting a position and/or a size of the first pattern by the user via a touch screen;

S27: adjusting the position and/or the size of the first pattern based on the adjustment instruction of adjusting a position and/or a size of the printing pattern on the user's nail model;

S28: printing the printing pattern based on a printing instruction.

In S21, the region image of the user's nail may be an image only including a region of the user's nail. When the region image of the user's nail is obtained, a user's nail image may be first obtained by the camera device disclosed in the first embodiment of the present disclosure, and the control module may obtain the region image of the nail according to the user's nail image. The user's nail image may include a user's finger, a nail, and a background of the image captured by the camera device, i.e., the user's nail image may be the user's finger image of the foregoing embodiment. In this embodiment, a manner for obtaining the region image of the user's nail may be not limited as long as the region image of the user's nail is obtained.

In S22, the second region may be the second region of the first interface as referred to the first embodiment of the present disclosure. If the user's finger sways on the nail holder, the user's nail model may also sway following the user's finger in real-time. Preferably, when the user's nail model is displayed, the user's nail model may be highlighted, i.e., compared with a color or a pattern of a surrounding of the user's nail model, the user's nail model may be more clear, brighter or have a higher brightness. For example, a background color of a region other than the user's nail model in the second region may be dark black. When the user's finger is normally placed on a nail holder, an extension direction of the user's nail model may be parallel to an up and down direction of a sight of the user on the display interface of the touch screen. The extension direction of the user's nail model may be perpendicular to a left and right direction of the sight of the user. The extension direction of the user's nail model may be ergonomic and easy for the user to observe.

In S23, the third region may be the third region of the first interface as referred to the first embodiment of the present disclosure. If the user clicks the second pattern in the third region, the second pattern clicked by the user in the third region may be identified. The second pattern clicked by the user may be the second pattern selected by the user. Preferably, the third region may include a second pattern in a predetermined row. The third region may have eight second patterns in four rows and two columns. It is for the purpose of illustration only and is not a limitation of the technical solution.

The third region may include a plurality of second patterns. When the control module receives the slide instruction, the plurality of slid second patterns after sliding may be displayed in the third region in real-time according to the slide instruction. The slide instruction may be an instruction generated by a sliding operation of the user's finger in the third region of the touch screen. The sliding operation may be sliding up, sliding down, sliding left or sliding right. The sliding operation may make it easier for the user to view the selected image. The control module may display the plurality of second patterns after the sliding in the third region based on the slide instruction. By sliding the finger on the touch screen, the second pattern not displayed may be viewed, the operability may be good, the operation may be simple and fast, and the visual dynamic effect may be good.

In S24, if the user selects the second pattern, the first pattern matching the selected second pattern may be displayed in the second region. The first pattern may cover an upper layer of the user's nail model for display, and may overlap a portion of the user's nail model. In some embodiments, the center of the first pattern may overlap the center of the user's nail model. The user may click on the second pattern. The first pattern corresponding to the second pattern may be directly displayed in the second region and overlap the center of the user's nail model without requiring the user to drag the pattern to the position of the user's nail model, and the operation is simple and quick. The first pattern may directly cover the user's nail model. Image elements in the first pattern may be substantially on the user's nail model, and a count of times that the user adjusts the first pattern may be reduced, which is advantageous for improving the efficiency for adjusting the pattern. The size of the first pattern may be automatically adjusted to match the size of the user's nail model. The center of the first pattern may follow the center of the user's nail model to move synchronously.

When the user's nail model is rotated, the first pattern may remain in the same orientation. When the user's nail model moves, the position of the first pattern may move synchronously. However, when the user's nail model is skewed, the first pattern may not rotate following the skew of the user's nail model. When the user selects the pattern to be printed, and finds that the position of the nail is not accurate enough, the nail position may be adjusted, the first pattern may move following the nail synchronously, and the user may not need to operate the first pattern again, which is convenient and quick, has good user experience and high intelligence. In some embodiments, the first pattern may be generated from the second pattern based on a predetermined ratio such that the size of the first pattern matches the size of the user's nail model. In some embodiments, the first pattern may be generated by zooming in or out the second pattern according to the predetermined ratio. In some embodiments, the size of the first pattern may be equal to or larger than the size of the user's nail model so that the user may adjust the size of the first pattern. If the second pattern displayed in the third region is smaller than the size of the user's nail model 122, the predetermined ratio may be equal to or larger than 1. If the second pattern displayed in the third region is larger than the size of the user's nail model 122, the predetermined ratio may be equal to smaller than 1. Thus the size of the first pattern may be larger than the user's nail model. A portion of the first pattern may be selected to be printed on the user's nail. The overlapped pattern of the first pattern and the user's nail model may be used as a printing pattern, i.e., a pattern printed on the user's nail. Preferably, the printing pattern may be highlighted to facilitate the user to view the printing effect of the portion of the pattern printed on the nail to adjust the pattern located within the user's nail model. Preferably, when the first pattern is displayed in the second region, a long side of the first pattern may be equal to a long side of the user's nail model. A wide side of the first pattern may be proportionally reduced or enlarged. For example, the size of the second pattern may be smaller than the size of the user's nail model. The user may select the second pattern, and when the first pattern matching the selected second pattern is displayed in the second region, If the user wants the first pattern larger than the user's nail model, the first pattern may need to be enlarged so that the long side of the user's nail model may be equal to the long side of the user's nail model, and the wide side of the first pattern may be zoomed out.

In S25, the second region may be the second region of the first interface as referred to the first embodiment of the present disclosure. If the user selects a second pattern, the first pattern matching the selected pattern of the second pattern may be displayed in the second region, and the effect print preview that the printing pattern is displayed on the user's nail may be displayed in the first region. The effect print preview may be a pattern that the printing pattern is fitted to the user's nail model. According to the effect print preview, the user may determine whether the printing pattern printed on his/her own finger satisfies his/her own requirements. If the requirements are not satisfied, the pattern may be changed in time, which is in line with practicality. By viewing the preview pattern, the user may be assisted in adjusting the first pattern to obtain a satisfied printing effect, and the user experience may be better.

In S26, when the user is dissatisfied with the position or size of the first pattern displayed in the second region, the position and/or size of the first pattern may be adjusted. In some embodiments, the control module may receive the adjustment instruction of adjusting the position and/or size of first pattern by the user via the touch screen. The user may generate the adjustment instruction by operating the touch screen. The adjustment instruction may include a movement instruction, a rotation instruction, a horizontal mirror instruction, a vertical mirror instruction or a proportional scaling instruction of a multi-touch. As an option, the first interface may include a rotation icon, a horizontal mirroring icon and a vertical mirroring icon. The rotation icon may be configured to generate the rotation instruction based on touch of the user. The horizontal mirroring icon may be configured to generate the horizontal mirror instruction based on the touch of the user. The vertical mirroring icon may be configured to generate the vertical mirror instruction based on the touch of the user. The user's finger may press the first interface and move the finger to press the first interface to generate a movement instruction. The user may press the first interface with two fingers and move the two fingers pressed the first interface to generate a multi-touch instruction for proportionally zooming in or out. It should be understood that the manner of generating the adjustment instruction may be not limited in this embodiment. It may be convenient for the user to quickly adjust the first pattern to improve printing efficiency by setting common shortcuts for image adjustment.

In S27, the position and/or size of the first pattern may be moved according to the movement instruction. The first pattern may be flipped according to the flip instruction. The first pattern may be mirrored horizontally according to the horizontal mirror instruction. The first pattern may be mirrored horizontally according to the vertical mirroring instruction. The first pattern may be proportionally scaled according to the multi-touch instruction for proportionally zooming in or out. By multi-touching and proportionally scaling the first pattern, the image in the first pattern may avoid being distorted and deformed. The adjustment may be only proportionally zoomed in or out and may not change a scaling relationship of the image. Some of the existing nail printing apparatuses may use a single-sided drag method to adjust the printing pattern causing distortion of the printing pattern, which may affect the printing effect, and the technical solution may have better printing effect.

In other embodiments, the control module may receive the center alignment instruction. According to the center alignment instruction, a touch position of the first pattern corresponding to the center alignment instruction of the user may be overlapped the center of the user's nail model, i.e., receiving the center alignment instruction. According to the center alignment instruction, the touch position of the first pattern corresponding to the center alignment instruction of the user may be overlapped the center of the user's nail model. When the user is dissatisfied with the position or size of the first pattern displayed in the second region, the center alignment instruction may be generated by operating the touch screen. Specifically, the center alignment instruction may be generated by clicking the touch screen by the user. If the user clicks on a certain position of the first pattern of the touch screen, a center alignment instruction may be generated. When the user clicks on a certain position of the first pattern of the touch screen to generate the center alignment instruction, the position of the first pattern corresponding to the center alignment instruction may be the certain position on which the user clicks of the first pattern of the touch screen. A position on which the user's finger clicks of the first pattern, and the position may overlap the center of the user's nail model. The user may quickly adjust a portion of the first pattern as a printing pattern.

In S28, when the aforementioned printing pattern is printed, the printing pattern of the first embodiment of the present disclosure may be printed on the user's nail. It should be understood that the user's nail may be coated with a base glue of the nail to facilitate the printing. Preferably, when the printing pattern is printed according to the printing instruction, the printed printing pattern may be displayed in the second region in real-time. Specifically, if a portion of the printing pattern printing on the user's finger, the portion of the printed printing pattern may be also displayed in the second region in real-time. When displayed in the second region, the portion of the printed printing pattern may be displayed within the user's nail model of the second region. The user's nail model may correspond to the user's nail. Therefore, the pattern displayed in the user's nail model may correspond to the printing pattern printed on the user's finger. The user may observe the printing progress of the printing pattern in real-time, so that the user may not have a tense feeling of not seeing nail conditions. Preferably, if a portion of the printing pattern is white when a white glue is coated on the nail, the portion of the white printing pattern may be not printed.

Preferably, S21 may include:

S211: obtaining an image of the user's nail;

S212: identifying a region image of the user's nail based on the image of the user's nail.

In S211, when the region image of the user's nail is obtained, the image of the user's nail may first be obtained by the camera device in the first embodiment of the present disclosure, and the control module may identify the region image of the nail according to the image of the user's nail.

In S212, in this embodiment, how to obtain the region image of the user's nail may be not limited. For example, a nail segmentation algorithm method may be used to obtain the region image of the user's nail. In the field of image processing, there may be many mature image segmentation algorithms, which are not described in detail here, and related materials may be referred. Merely by way of example, the image segmentation algorithm may include a threshold-based segmentation algorithm, an edge-based segmentation algorithm, a region-based segmentation algorithm, a clustering-based segmentation algorithm, or the like, or any combination thereof.

In some embodiments, S212 may include:

S2121: performing grayscale processing on the image of the user's nail to obtain a grayscale image of the user's nail;

S2122: calculating an average grayscale value of the grayscale image of the user's nail;

S2123: obtaining a difference of average grayscale values between the average grayscale value of the grayscale image of the user and an average grayscale value of a predetermined background image;

S2124: obtaining a first color and a second color from the user's nail image when the difference of average grayscale values is greater than a predetermined difference threshold of the grayscale values;

S2125: obtaining a contrast ratio between the first color and the second color;

S2126: comparing the contrast ratio to a predetermined threshold of the contrast ratio;

S2127: initiating a predetermined nail segmentation algorithm to obtain the region image of the nail if the contrast ratio is greater than the predetermined contrast ratio threshold.

In S2121, if the image of the user's nail obtained by the camera device may be a color image, the grayscale processing for the color image of the user's nail may perform firstly. The user's nail image may be converted into a grayscale image so that the subsequent contrast ratio of the first color and the second color may be more accurate, and the accuracy of the nail recognition and segmentation algorithm may be improved. When the camera is a grayscale camera, the obtained image of the user's nail may be a grayscale image, and the grayscale processing may be not required.

In S2122, in this embodiment, the calculating the average grayscale value of the grayscale image of the user's nail may be a commonly used method in the image processing, and details may be not described herein, and related materials may be referred. For illustration purpose, a sum of grayscale values of all pixels in the grayscale image of the user's nail may be determined. The number of all pixels in the grayscale image of the user's nail may be determined. The average grayscale value may be a ratio of the sum of grayscale values of all pixels to the number of all pixels.

In S2123, the predetermined background image may be an image obtained when no user's finger is placed on the nail holder, or may be an image collected in a last period for collecting images. The average grayscale value of the grayscale image of the user's nail and the average grayscale value of the predetermined background image may be calculated, respectively. The difference between the two average grayscale values may be obtained to obtain the difference of the average grayscale values. The difference of the average grayscale values may be compared with the predetermined difference threshold of the grayscale values. If the difference of the average grayscale values is greater than the predetermined difference threshold of the grayscale values, the process may proceed to step S2124. If the difference of the average grayscale values is less than or equal to the predetermined difference threshold of the grayscale values, the process may return to step S211 to reobtain the user's nail image. The predetermined difference threshold of the grayscale values may be 10, and only an example and not intended to limit the technical solution.

In S2124, the user's nail image may include a region image of the user's nail and an image of other portions. A difference between a color of the nail region image and a color of the image of the other portions may be large. The first color may be the color of the nail, and the second color may be the color of a portion other than the nail region image. Therefore, the first color and the second color may be obtained according to the user's nail image. It should be understood that when the user's nail is printed, a base glue of the nail may be manually coated on the target nail or after the base glue is coated, a white glue may be coated, which may facilitate the printing of the pattern and prolong a maintaining time of the pattern on the nail. When there is no base glue on the nail, the pattern may be not easy to adhere to the nail. After the base glue is coated, if the white glue is coated on the nail, the between the color of the nail and the color of the portion other than the nail may be larger, which may be beneficial to improve the accuracy of identifying the nail.

In S2124, the contrast ratio may be obtained according to the first color and the second color, and the method for obtaining the image contrast ratio may be a common method in the image processing, and not be described in detail herein. For illustration purpose, the contrast ratio may be determined based on Equation (1) below:

$$C = \Sigma_\delta \delta(i,j)^2 P_\delta(i,j) \quad (1)$$

wherein δ(i,j) equals to |i−j|, and represents a difference of grayscale values between two adjacent pixels in the image, and $P_δ(i,j)$ represents a distribution probability of pixels in the image.

In S2126, by comparing the contrast ratio with the predetermined threshold of the contrast ratio, whether the contrast ratio is greater than the predetermined contrast ratio threshold may be determined. The contrast ratio threshold may be 50%. The contrast ratio threshold may also be selected according to actual demands, and not specifically limited herein.

In S2127, a predetermined nail segmentation algorithm may be initiated to obtain the region image of the nail if the contrast ratio is greater than the predetermined contrast ratio threshold. The nail segmentation algorithm may segment the region image of the nail from the nail image more accurately. The user's nail model described in the first embodiment may match the region image of the nail segmented by the nail segmentation algorithm.

The embodiment of the present disclosure may first compare the average grayscale value of the user's nail image with the average grayscale value of the predetermined background image. The first color and the second color may be obtained from the image of the user's nail if the difference of the average grayscale values is greater than the predetermined difference threshold of the grayscale values. When the contrast ratio of the first color and the second color is greater than the predetermined contrast ratio threshold, the predetermined nail segmentation algorithm may be initiated to obtain the nail image. When no user's finger or no cardboard is placed within the nail printing apparatus, or a difference between a color of the base glue coated on the user's nail and a color of a surrounding environment is small, the predetermined nail segmentation algorithm may be not initiated, thereby reducing the amount of computation data and helping extend the life of the processing device and reducing the waste of electric power.

In some embodiments, S23: the identifying the second pattern selected by the user in the third region may include:
S231: obtaining a touch coordinate of the user in the third region;
S232: identifying a second pattern corresponding to the touch coordinate.

In S231, each position of the display interface of the touch screen may have a coordinate. When the user clicks the touch screen, a coordinate of a position that the user clicks on the touch screen may be obtained, i.e., the touch coordinate of the user.

In S232, the third region may include a plurality of second patterns. If the touch coordinate falls within a coordinate range of the second pattern, the second pattern and the touch coordinate may correspond to each other, and the second pattern corresponding to the touch coordinate may be identified. The second pattern selected by the user may be quickly identified.

In this embodiment, the user may directly select the second pattern by single clicking, and the operation may be convenient and fast, and the user experience may be good.

In some embodiments, in S24, the displaying a first pattern in the second region, wherein the first pattern coincides with the second pattern, the user's nail model overlaps a portion of the first pattern, a center of the first pattern overlaps a center of the user's nail model, and the portion of the first pattern overlapping the user's nail model is used as a printing pattern may include:
S241: obtaining a coordinate of the second region;
S242: displaying the second pattern 111 corresponding to the touch coordinate as the first pattern 121 in the second region 12 so that the user's nail model 122 and the first pattern 121 partially overlap.

In S241, when the coordinate of the second region is obtained, a center coordinate and an edge coordinate of the user's nail model in the second region may be preferably obtained. As an option, the center coordinate of the user's nail model in the second region may be obtained, and all coordinates of the second region may also be obtained.

In S242, after obtaining the coordinate of the second region, the first pattern and the user's nail model may be overlapped. In some embodiments, the center of the first pattern 121 may overlap the center of the user's nail model 122. When the center of the first pattern overlaps the center of the user's nail model, a main image of the first pattern may be overlaid in the nail region, thereby reducing the count of adjustments to the first pattern by the user. Alternatively, the first pattern may be spread over the second region or the first pattern may occupy a certain proportion of the second region.

In this embodiment, the first pattern may be automatically overlapped the user's nail model, thereby reducing the operation of dragging the first pattern to the user's nail model of the user, saving the user operation and improving the nail printing efficiency.

Figure 5:
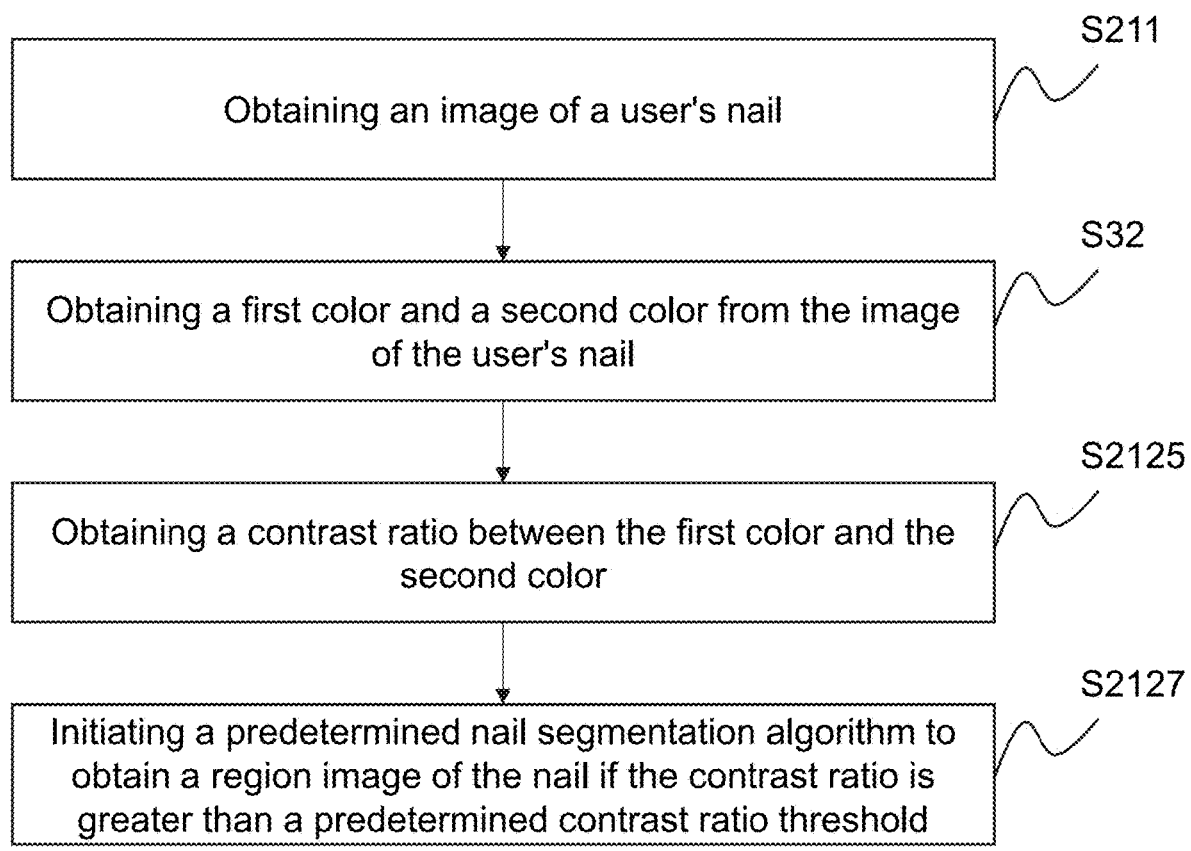
FIG. 5 is a flowchart illustrating a method of obtaining a region image of a nail of a nail printing apparatus according to a third embodiment of the present disclosure.

Referring to FIG. 5, a third embodiment of the present disclosure may provide a method for obtaining a nail region image of a nail printing apparatus based on the foregoing embodiments. The method for obtaining the nail region image of the nail printing apparatus may be performed by a system for obtaining the nail region image of the nail printing apparatus. The system may be implemented by means of hardware and/or software and usually integrated in the nail printing apparatus. The nail printing apparatus according to the first embodiment of the present disclosure may be configured to obtain the nail region image. The method for obtaining the nail region image of the nail printing apparatus may include:
S31: obtaining the user's nail image;
S32: obtaining a first color and a second color from the user's nail image;
S33: obtaining a contrast ratio between the first color and the second color;
S34: initiating a predetermined nail segmentation algorithm to obtain the nail region image if the contrast ratio is greater than a predetermined contrast ratio threshold;

Preferably, after S33, the method may also include:
Comparing the contrast ratio with the predetermined contrast threshold.

As an option, after S31, the method may also include:
perform grayscale processing on the user's nail image to obtain a grayscale image of the user's nail;

It may be understood that, for each step of the method for obtaining the nail region image of the nail printing apparatus provided in this embodiment may refer to the steps of the nail printing method in the second embodiment, and the steps may be not explained and illustrated in this embodiment.

The third embodiment of the present disclosure may provide the method for obtaining the nail region image of the nail printing apparatus. The first color and the second color may be obtained from the user's nail image, and the contrast ratio between the first color and the second color may be obtained. If the contrast ratio is greater than a predetermined contrast ratio threshold, the predetermined nail segmentation algorithm to obtain the nail region image may be initiated.

When no user's finger or no cardboard is placed within the nail printing apparatus, or a difference between colors of the base glue coated on the user's nail and the surrounding environment is small, the predetermined nail segmentation algorithm may be not initiated, which may reduce the amount of computation data and help extend the life of the processing device and reduce the waste of electric power.

In an embodiment, after performing grayscale processing on the user's nail image to obtain the grayscale image of the user's nail, the method may further include:

S2122: calculating an average grayscale value of the grayscale image of the user's nail;

S2123: obtaining a difference of average grayscale values between the average grayscale value of the grayscale image of the user's nail and an average grayscale value of the predetermined background image;

S2124: obtaining a first color and a second color from the user's nail image when the difference of average grayscale values is greater than a predetermined difference threshold the average grayscale values;

For a detailed description of the above steps, refer to the corresponding content of the second embodiment, and details may not be described herein again.

The technical solution of this embodiment may compare the average grayscale value of the grayscale image of the user's nail with the average grayscale value of the predetermined background image to determine whether to continue the following step of obtaining the colors. When the difference of the average grayscale values is less than or equal to the predetermined difference threshold of the average grayscale values, it may be considered that no user's nail is placed in the nail printing apparatus, and no subsequent processing steps may be performed, otherwise, the subsequent processing may continue, which may save the amount of processing data and help extend the life of the processing device.

Figure 6:
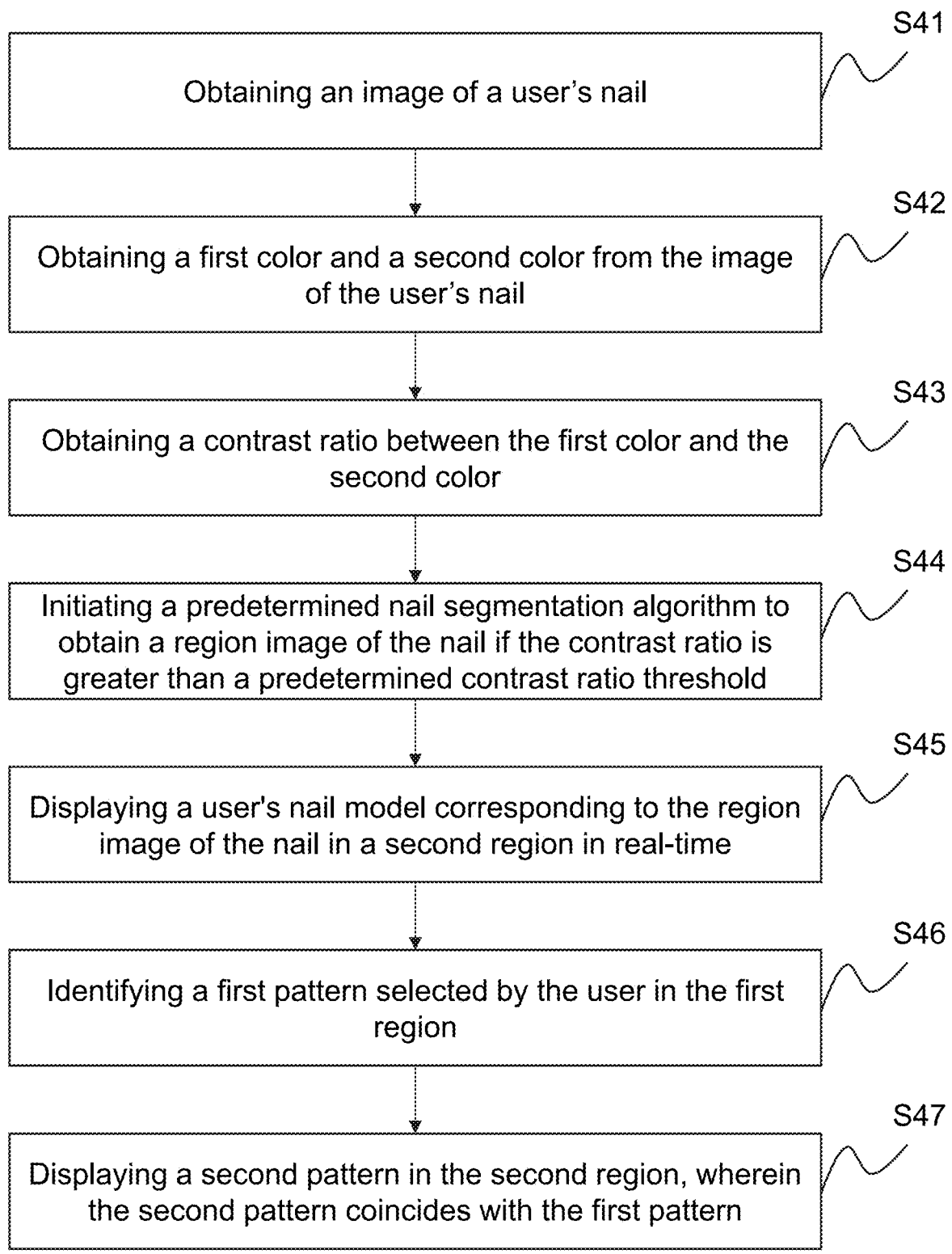
FIG. 6 is a flowchart illustrating a method of obtaining a region image of a nail of a nail printing apparatus according to a fourth embodiment of the present disclosure.

Referring to FIG. 6, a fourth embodiment of the present disclosure may provide a method for obtaining a nail region image of a nail printing apparatus. This embodiment may provide a solution for processing the nail region image based on the foregoing embodiment. The nail printing apparatus may include a touch screen. The touch screen may be configured to display the first interface. The first interface may include a third region and a second region. The third region may include a plurality of second patterns. The touch screen may be the touch screen of the first embodiment of the present disclosure. The method for obtaining the nail region image may include:

S41: obtaining an image of the user's nail;

S42: obtaining a first color and a second color from the image of the user's nail;

S43: obtaining a contrast ratio between the first color and the second color;

S44: initiating a predetermined nail segmentation algorithm to obtain the region image of the nail if the contrast ratio is greater than the predetermined contrast ratio threshold;

S45: displaying a user's nail model corresponding to the region image of the nail in the second region in real-time;

S46: identifying a second pattern selected by the user in the third region;

S47: displaying a first pattern in the second region, wherein the first pattern coincides with the second pattern, the user's nail model overlaps at least a portion of the first pattern, and the center of the first pattern overlaps the user's nail model.

It may be understood that, for each step of the method for obtaining the nail region image of the nail printing apparatus provided in this embodiment may refer to the steps of the nail printing method in the second embodiment, and the steps may be not explained and illustrated in this embodiment.

The fourth embodiment of the present disclosure may provide the method for acquiring the region image of the nail of the nail printing apparatus. The nail model corresponding to the user's nail may be displayed. The first pattern corresponding to the second pattern selected by the user may be overlaid on the user's nail model. The effect of overlying the selected pattern on the user's nail model may be realized by clicking, and the operation is simple, and the user may not need to drag. Further, the center of the first pattern may overlap the center of the user's nail model, so that the user may adjust the position and size of the first pattern to adjust the pattern printed on the nail. The user may also view the pattern printed on the nail through the user's nail model.

As an option, after 47, it may also include:

receiving an adjustment instruction of adjusting a position and/or size of the first pattern by the user through a touch screen;

based on the adjustment instruction of adjusting the position and/or the size of the first pattern, adjusting the position and/or the size of the printing pattern on the user's nail model.

In this embodiment, the position or size of the first pattern may be adjusted by the operation on the touch screen, which may be convenient and the user experience may be good.

Figure 7:
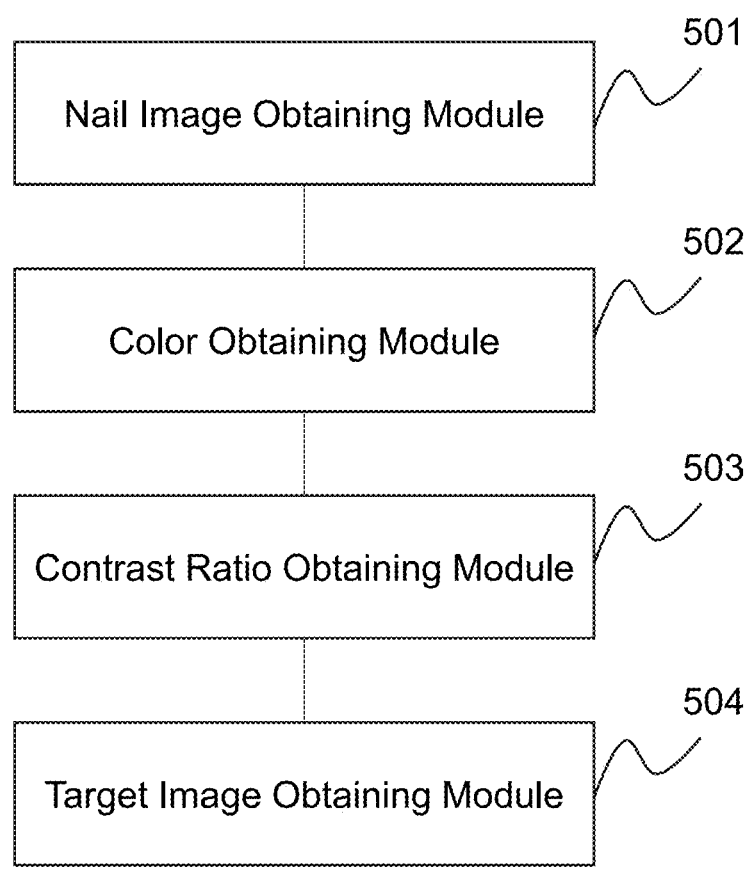
FIG. 7 is a structural diagram illustrating a method of obtaining a region image of a nail of a nail printing apparatus according to a fifth embodiment of the present disclosure.

Referring to FIG. 7, a fifth embodiment of the present disclosure may provide a system 500 for obtaining a nail region image of a nail printing apparatus. The system 500 may implement a method for obtaining the nail region image. The nail printing apparatus may include a touch screen. The touch screen may be configured to display a first interface. The first interface may include a third region and a second region. The third region may include a plurality of second patterns. The system 500 for obtaining the nail region image of the nail printing apparatus may include:

a nail image obtaining module 501 configured to an image of the user's nail;

a color obtaining module 502 configured to obtain a first color and a second color;

from the nail image;

a contrast ratio obtaining module 503 configured to obtain a contrast ratio between the first color and the second color; and a target image obtaining module 504 configured to initiate a predetermined nail segmentation algorithm to obtain the region image of the nail if the contrast ratio is greater than the predetermined contrast ratio threshold.

The fourth embodiment of the present disclosure may provide the system 500 for obtaining the nail region image of the nail printing apparatus. The system may obtain the first color and the second color from the image of the user's nail. When the contrast ratio between the first color and the second color is greater than the predetermined contrast ratio threshold, the system may initiate a predetermined nail segmentation algorithm to obtain the region image of the nail. When no user's finger or no cardboard is placed within the nail printing apparatus, or a difference between colors of the base glue coated on the user's nail and the surrounding environment is small, the predetermined nail segmentation algorithm may be not initiated, which may reduce the amount of computation data and help extend the life of the processing device and reduce the waste of electric power.

The system 500 for obtaining the nail region image of the nail printing apparatus may also include:

a comparison module configured to compare the contrast ratio with the predetermined contrast ratio threshold;

a grayscale processing module configured to perform grayscale processing on the image of the user's nail;

an average grayscale value obtaining module configured to calculate an average grayscale value of the grayscale image of the user's nail;

a difference calculation module configured to obtain a difference of average grayscale values between the average grayscale value of the grayscale image of the user's nail and an average grayscale value of a predetermined background image;

a model displaying module configured to display the user's nail model corresponding to the nail region image in the second region in real-time;

a pattern identification module configured to identify a second pattern selected by the user in the third region;

a pattern displaying module configured to display the user's nail model in the second region, wherein the first pattern coincides with the second pattern, the user's nail model overlaps at least a portion of the first pattern, and the center of the first pattern overlaps the user's nail model;

a first receiving module configured to receive an adjustment instruction for adjusting a position and/or a size of the first pattern through the touch screen;

an adjustment module configured to adjust the position and/or the size of the printing pattern on the user's nail model based on the adjustment instruction of adjusting the position and/or the size of the first pattern.

Figure 8:
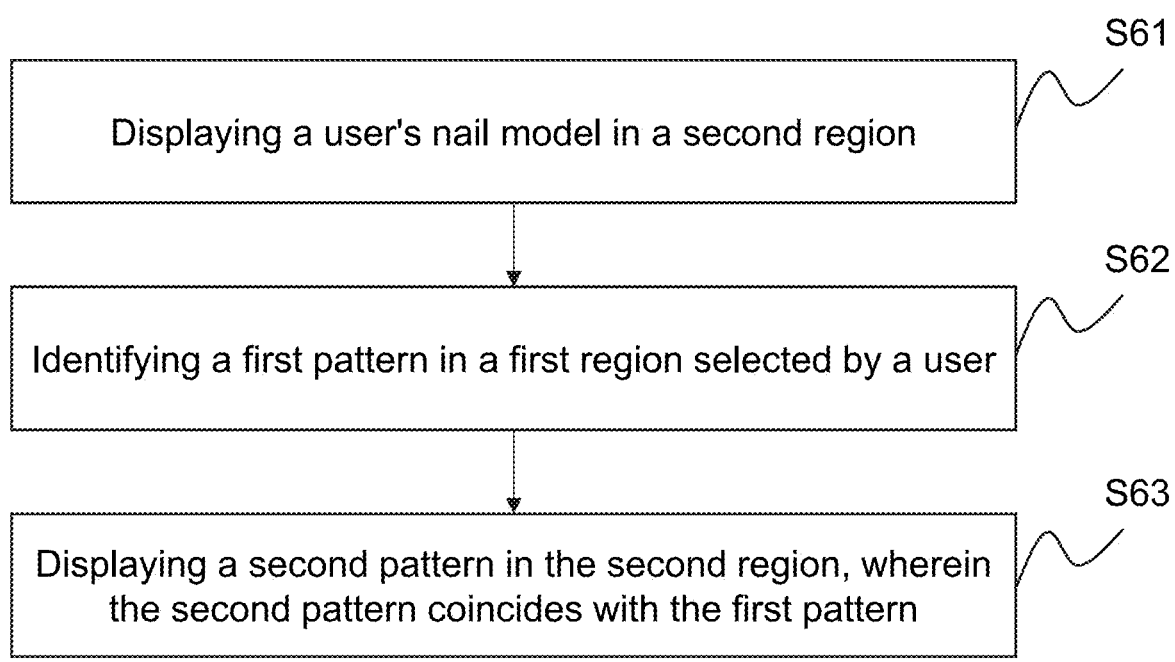
FIG. 8 is a flowchart illustrating an image processing method of a nail printing apparatus according to a sixth embodiment of the present disclosure.

Referring to FIG. 8, a sixth embodiment of the present disclosure may provide a method for processing an image of a nail printing apparatus based on the foregoing embodiment. A system for processing the image of the nail printing apparatus may perform the method for processing the image of the nail printing apparatus. The system may be implemented by means of hardware and/or software and usually integrated in the nail printing apparatus. The nail printing apparatus according to the first embodiment of the present disclosure may be configured to process a pattern to be printed. The nail printing apparatus may include a touch screen. The touch screen may be configured to display a first interface. The first interface may include a third region and a second region. The third region may include a plurality of second patterns. The touch screen may be the touch screen of the first embodiment in the present disclosure. The method for processing the image of the nail printing apparatus. The system may include:

S61: displaying a user's nail model in the second region;

S62: identifying a second pattern selected by the user in the third region;

S63: displaying a first pattern in the second region, wherein the first pattern coincides with the second pattern, and the user's nail model overlaps at least a portion of the first pattern.

Preferably, the center of the first pattern may overlap the center of the user's nail model. The at least a portion of the first pattern overlapping the user's nail model may be a printing pattern. The user may click the second pattern. The first pattern corresponding to the second pattern may be directly displayed in the second region. The first pattern may overlap the center of the user's nail model, and the user may not need to drag the pattern to the position of the user's nail model, and the operation is simple and quick. The first pattern may directly cover the user's nail model. Image elements in the first pattern may be substantially on the user's nail model, and a count of times that the user adjusts the first pattern may be reduced, which is advantageous for improving the efficiency for adjusting the pattern. The printing pattern may be highlighted to facilitate the user to view the printing effect of the portion of the pattern printed on the nail to adjust the pattern located within the user's nail model. An extension direction of the user's nail model may be parallel to an up and down direction of a sight of the user on the display interface of the touch screen. The extension direction of the user's nail model may be perpendicular to a left and right direction of the sight of the user. The size of the first pattern may be automatically adjusted to match the size of the user's nail model. The second pattern may be only for the user to view the selection. The size may be relatively small, and the user may see the pattern clearly. After the second pattern is selected, the size of the first pattern corresponding to the second pattern may be automatically adjusted according to the size of the user's nail model, which may reduce a count of times that the user adjusts the first pattern, and be good for viewing. The center of the first pattern may follow the center of the user's nail model to move synchronously. When the user's nail model is rotated, the first pattern may remain in the same orientation. When the position of the nail is not accurate enough, the user may adjust the position of the nail, the user's nail model may move following the nail synchronously, the center of the first pattern may move following the movement of the center position of the user's nail model and the user may not need to drag the first pattern manually to cover the first pattern on the adjusted positon of the user's nail. Such high intelligence may need no user operation, requiring little time and few efforts thereby, enhancing the user experience and being beneficial to the improvement of the printing efficiency.

Preferably, before S61, the method may include:

obtaining the image of the user's nail; and identifying the nail region image based on the nail image, and wherein the user's nail model is displayed in the second region in real-time, and the user's nail model corresponds to the region image of the user's nail.

It may be understood that, for each step of the method for obtaining the nail region image of the nail printing apparatus provided in this embodiment may refer to the steps of the nail printing method in the second embodiment, and the steps may be not explained and illustrated in this embodiment.

The sixth embodiment of the present disclosure may provide the method for processing the image of the nail printing apparatus. By identifying the second pattern selected by the user in the third region, the first pattern coinciding with the selected second pattern may be displayed in the second region. The center of the first pattern may overlap the user's nail model. The user may select the preferred second pattern by a single touch. The first pattern that matches the selected second pattern image may be automatically overlapped the user's nail model and overlapped the center of the user's nail model. It may be easier to select the pattern for printing, which may reduce the complexity of the user operation and improve the user experience. In the second region, the user may visually see the portion of the pattern overlapped the user's nail model, which may be convenient for the user to adjust the first pattern, and be beneficial to improve the printing effect and the user satisfaction.

Figure 9:
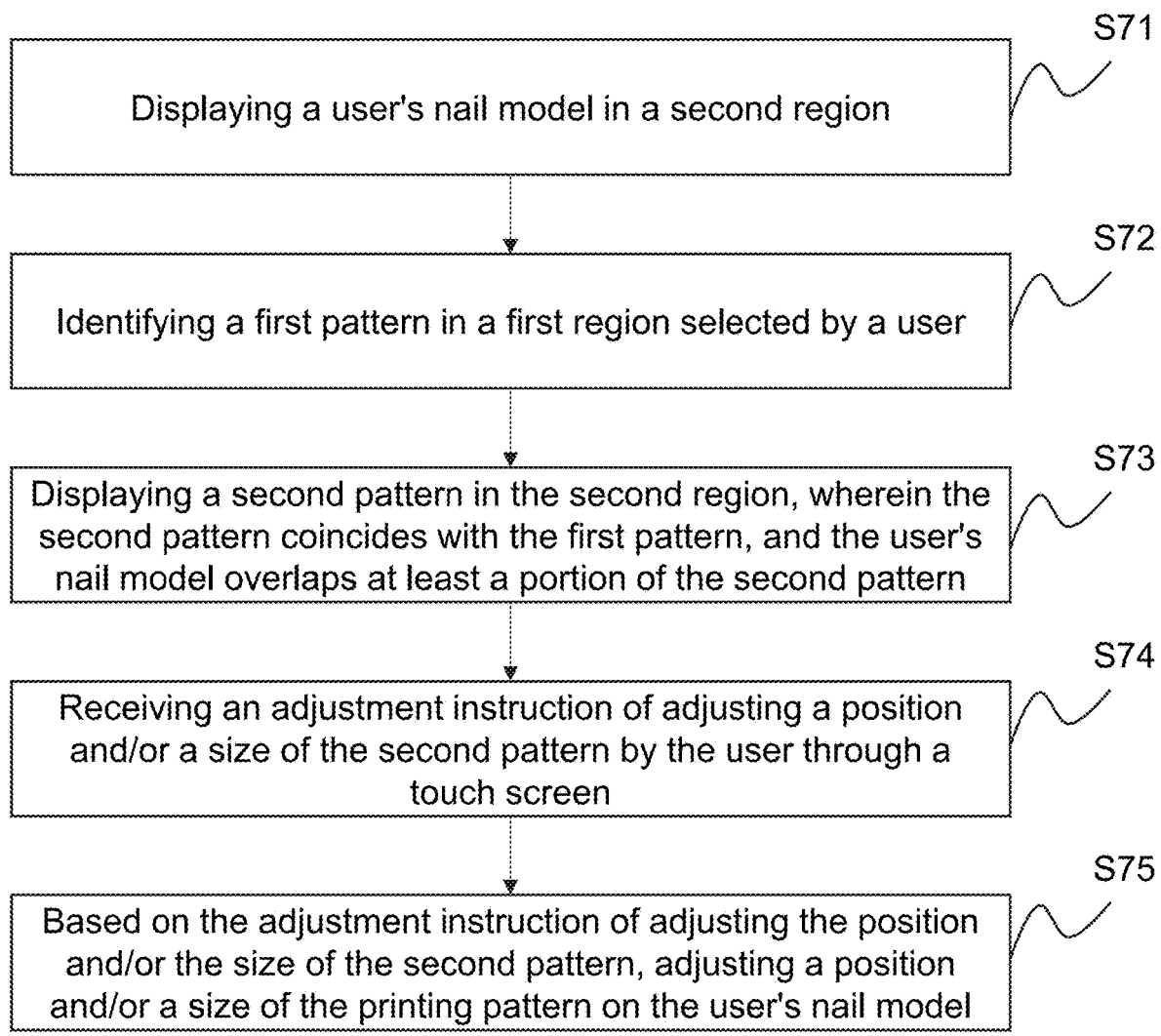
FIG. 9 is a flowchart illustrating an image processing method of a nail printing apparatus according to a seventh embodiment of the present disclosure.

Referring to FIG. 9, a seventh embodiment of the present disclosure may also provide a method for processing an image of a nail printing apparatus. This embodiment may provide a solution for adjusting a position and/or size of a first pattern based on the foregoing embodiments. The method for processing the image of the nail printing apparatus may include:

S71: displaying a user's nail model in a second region;

S72: identifying a second pattern selected by the user in the third region;

S73: displaying the first pattern in the second region, wherein the first pattern coincides with the second pattern, and the user's nail model overlaps at least a portion of the first pattern;

S74: receiving an adjustment instruction of adjusting the position and/or the size of the first pattern by the user through a touch screen;

S75: based on the adjustment instruction of adjusting the position and/or the size of the first pattern, adjusting a position and/or a size of the printing pattern on the user's nail model.

The adjustment instruction may include a movement instruction and a multi-touch instruction for proportionally zooming in or out. The movement instruction may be used to move the position of the first pattern. The first pattern may be proportionally scaled according to the multi-touch instruction for proportionally zooming in or out. By multi-touching and proportionally scaling the first pattern, the image in the first pattern may avoid being distorted and deformed, which may not affect the printing effect. By adjusting the first pattern in the proportionally scaling mode, the authenticity of the printing pattern may remain, thereby improving the printing effect and the user satisfaction. In some embodiments, the adjustment instruction may include a rotation instruction, a horizontal mirror instruction and a vertical mirror instruction. The first interface may include a rotation icon, a horizontal mirroring icon and a vertical mirroring icon. The rotation icon may be configured to generate the rotation instruction based on touch of the user. The horizontal mirroring icon may be configured to generate the horizontal mirror instruction based on the touch of the user. The vertical mirroring icon may be configured to generate the vertical mirror instruction based on the touch of the user. It may be convenient for the user to quickly adjust the first pattern to improve printing efficiency by setting common shortcuts for image adjustment.

It may be understood that, for each step of the method for processing the image of the nail printing apparatus provided in this embodiment may refer to the steps of the nail printing method in the second embodiment, and the steps may be not explained and illustrated in this embodiment.

The seventh embodiment of the present disclosure may provide the method for processing the image of the nail printing apparatus. The position and size of the first pattern may be adjusted by the touch mode on the touch screen. The operation may be simple, and the user may facilitate to adjust the pattern printed on the nail by adjusting the position and size of the first pattern. The user may also view the pattern printed on the nail by the user's nail model.

Figure 10:
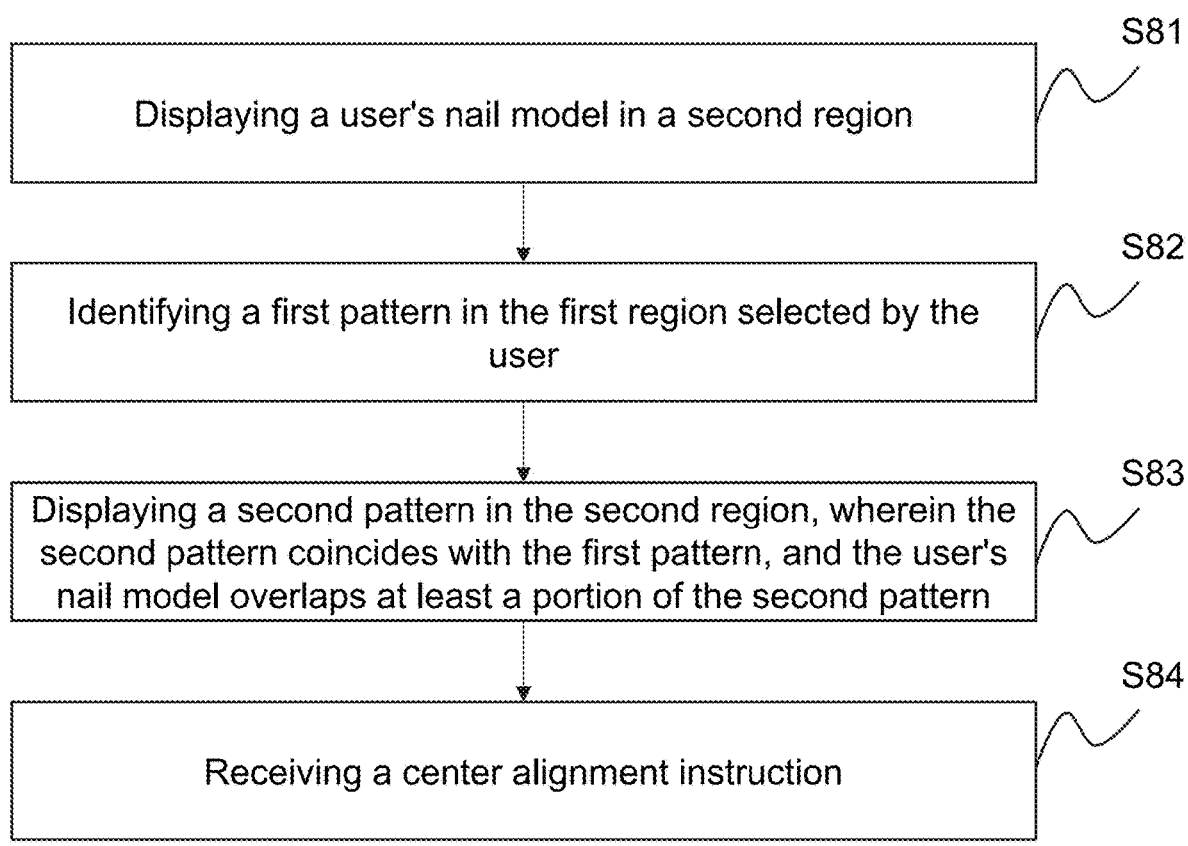
FIG. 10 is a flowchart illustrating an image processing method of a nail printing apparatus according to an eighth embodiment of the present disclosure.

Referring to FIG. 10, an eighth embodiment of the present disclosure may also provide a method for processing an image of a nail printing apparatus. This embodiment may provide a solution for adjusting a position of a first pattern based on the foregoing embodiments. The method for processing the image of the nail printing apparatus may include:

S81: displaying a user's nail model in a second region;

S82: identifying a second pattern selected by the user in a third region;

S83: displaying the first pattern in the second region, wherein the first pattern coincides with the second pattern, and the user's nail model overlaps at least a portion of the first pattern;

S84: receiving a center alignment instruction; and

S85: according to the center alignment instruction, overlapping the position of the first pattern corresponding to the center alignment instruction and a center of the user's nail model according to the center alignment instruction.

It may be understood that, for each step of the method for processing the image of the nail printing apparatus provided in this embodiment may refer to the steps of the nail printing method in the second embodiment, and the steps may be not explained and illustrated in this embodiment.

The eighth embodiment of the present disclosure may provide a method for processing the image of the nail printing apparatus. According to the center alignment instruction, the position of the first pattern corresponding to the center alignment instruction may overlap the center of the user's nail model according to the center alignment instruction. The user may adjust at least a portion of the first pattern to overlap the user's nail model quickly, which may allow the user to select the at least a portion of the first pattern as the printing pattern quickly.

Figure 11:
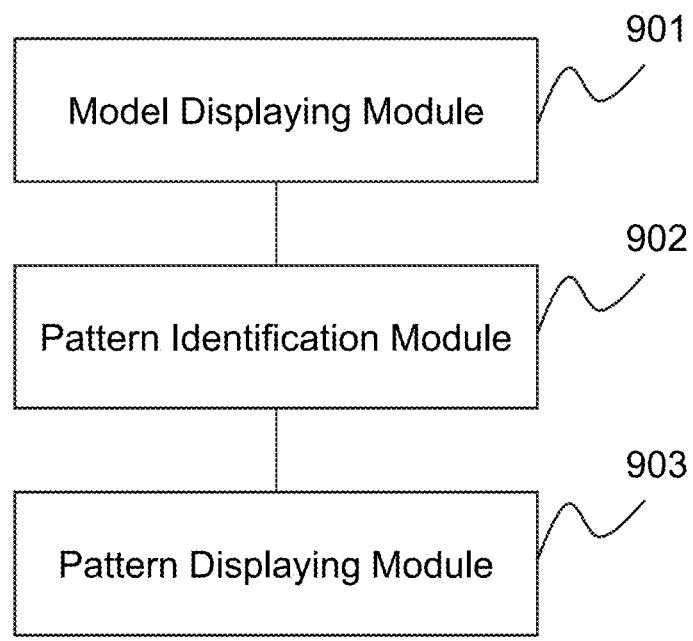
FIG. 11 is a structural diagram illustrating an image processing method of a nail printing apparatus according to a ninth embodiment of the present disclosure.

Referring to FIG. 11, a ninth embodiment of the present disclosure may provide a system 900 for processing image of a nail printing apparatus. The system 900 may implement the method for processing the image of the nail printing apparatus. The nail printing apparatus may include a touch screen. The touch screen may be configured to display a first interface. The first interface may include a third region and a second region. The third region may include a plurality of second patterns. The system 900 for processing the image of the nail printing apparatus may include:

a model displaying module 901, configured to display a user's nail model in the second region;

a pattern identification module 902 configured to identify a second pattern selected by a user in a third region; and a pattern displaying module 903 configured to display a user's nail model in a second region, wherein the first pattern coincides with the second pattern, and the user's nail model overlaps at least a portion of the first pattern.

The ninth embodiment of the present disclosure may provide the system for processing the image of the nail printing apparatus. By identifying the second pattern selected by the user in the third region, the first pattern coinciding with the selected second pattern may be displayed in the second region. The center of the first pattern may overlap the user's nail model. The user may select the preferred second pattern by a single touch. The first pattern that matches the selected second pattern image may be automatically overlapped the user's nail model and overlapped the center of the user's nail model. It may be easier to select the pattern for printing, which may reduce the complexity of the user operation and improve the user experience. In the second region, the user may visually see the at least a portion of the pattern overlapped the user's nail model, which may be convenient for the user to adjust the first pattern, and be beneficial to improve the printing effect and the user satisfaction.

The system 900 for processing the image of the nail printing apparatus may also include:

a nail image obtaining module configured to obtain an image of the user's nail;

a nail region image obtaining module configured to identify a region image of the nail according to the image of the user's nail.

a first receiving module configured to receive an adjustment instruction of adjusting a position and/or a size of the first pattern through the touch screen;

an adjustment module configured to adjust the position and/or the size of the printing pattern on the user's nail model based on the adjustment instruction of adjusting the position and/or the size of the first pattern;

a third receiving module configured to receive a center alignment instruction; and the aligning module configured to overlap the position of the first pattern 121 corresponding to the center alignment instruction and a center of the user's nail model according to the center alignment instruction.

Figure 12:
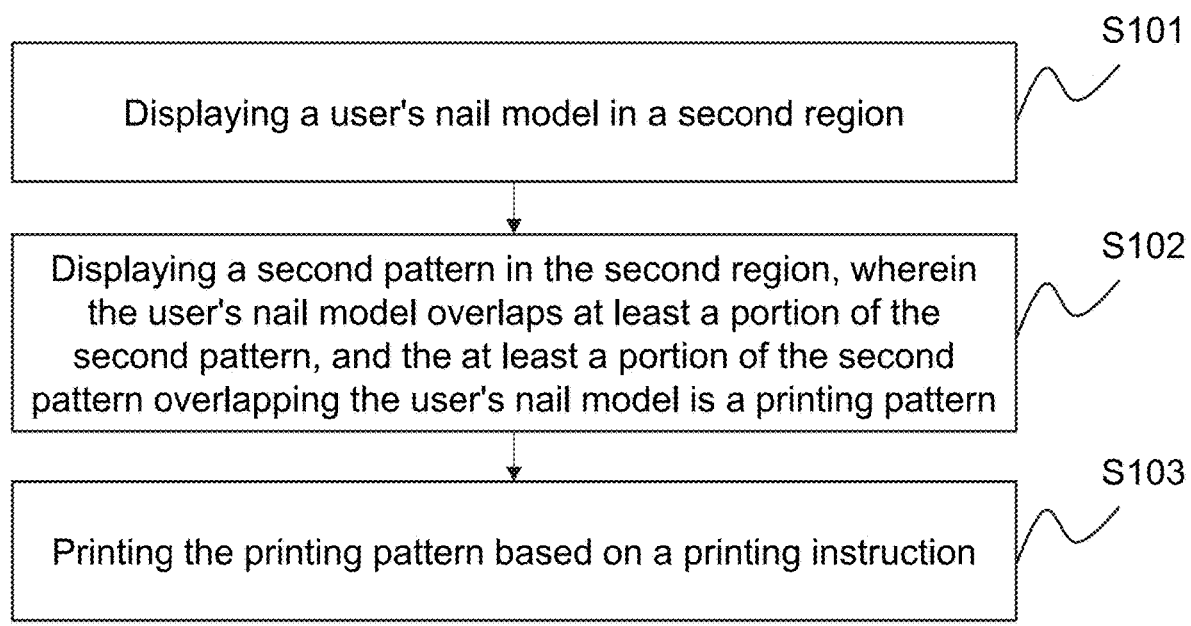
FIG. 12 is a flowchart illustrating a printing method of a nail printing apparatus according to a tenth embodiment of the present disclosure.

Referring to FIG. 12, a tenth embodiment of the present disclosure may provide a printing method of a nail printing apparatus based on the foregoing embodiments. A printing system of the nail printing apparatus may perform the printing method of the nail printing apparatus. The system may be implemented by means of hardware and/or softwares and usually integrated in the nail printing apparatus. The nail printing apparatus in the first embodiment of the present disclosure may print the user's nail. The nail printing apparatus may include a touch screen. The touch screen may be configured to display a first interface. The first interface may include a third region and a second region. The third region may include a plurality of second patterns. The printing method of the nail printing apparatus may include:

S101: displaying a user's nail model in the second region;
S102: displaying a first pattern in the second region, wherein the user's nail model overlaps at least a portion of the first pattern, and the at least a portion of the first pattern overlapping the user's nail model is a printing pattern; and
S103: printing the printing pattern based on a printing instruction.

Preferably, after printing the printing pattern based on the printing instruction, the method may include:
displaying a printed printing pattern in the second region in real-time.

Preferably, before S101, the method may also include:
obtaining a region image of the user's nail, wherein the user's nail model is displayed in the second region in real-time, and the user's nail model corresponds to the region image of the user's nail.

Preferably, before S102, the method may also include:
identifying the second pattern selected by the user in the third region; wherein the first pattern coincides with the selected second pattern.

Preferably, before S103, the method may also include receiving a printing instruction. The printing instruction may be generated by touching a printing icon described in the first embodiments by the user.

Preferably, the first interface may also include a first region. Before S103, the method may also include: displaying an effect print preview of the printing pattern on the user's nail in the first region.

Preferably, the printing method of the nail printing apparatus may also include:
receiving a slide instruction; and
displaying the plurality of second patterns after sliding in the third region based on the slide instruction.

Preferably, the printing the printing pattern based on a printing instruction may include: displaying a printed printing pattern in the second region in real-time.

It may be understood that, for each step of the printing method of the nail printing apparatus provided in this embodiment may refer to the steps of the nail printing method in the second embodiment, and the steps may be not explained and illustrated in this embodiment.

The seventh embodiment of the present disclosure may provide the printing method of the nail printing apparatus. The at least a portion of the pattern overlapped the user's nail model may be used as the printing pattern. Only the portion of the pattern overlapped the user's nail model may be printed during printing thereby reducing the pattern to be printed, saving ink, prolonging a usage time of the ink cartridge, and helping reduce costs. The pattern other than the user's nail model may be not printed. After the printing is completed, no ink may be sprayed on fingers around the nails, and it may be unnecessary to use an anti-overflow glue on the fingers around the nail, which may not only save the cost, but also reduce two processes of coating the anti-overflow glue before the printing and cleaning the anti-overflow glue after the printing and improve the nail printing efficiency.

In one embodiment, the obtaining the region image of the user's nail may include:
obtaining an image of the user's nail; and
identifying the region image of the user's nail based on the image of the user's nail.

Preferably, the identifying the second pattern selected by the user in the third region may include:
obtaining a touch coordinate of the user in the third region; and
identifying the second pattern corresponding to the touch coordinate.

It may be understood that, for each step of the printing method of the nail printing apparatus provided in this embodiment may refer to the steps of the nail printing method in the second embodiment, and the steps may be not explained and illustrated in this embodiment.

Figure 13:
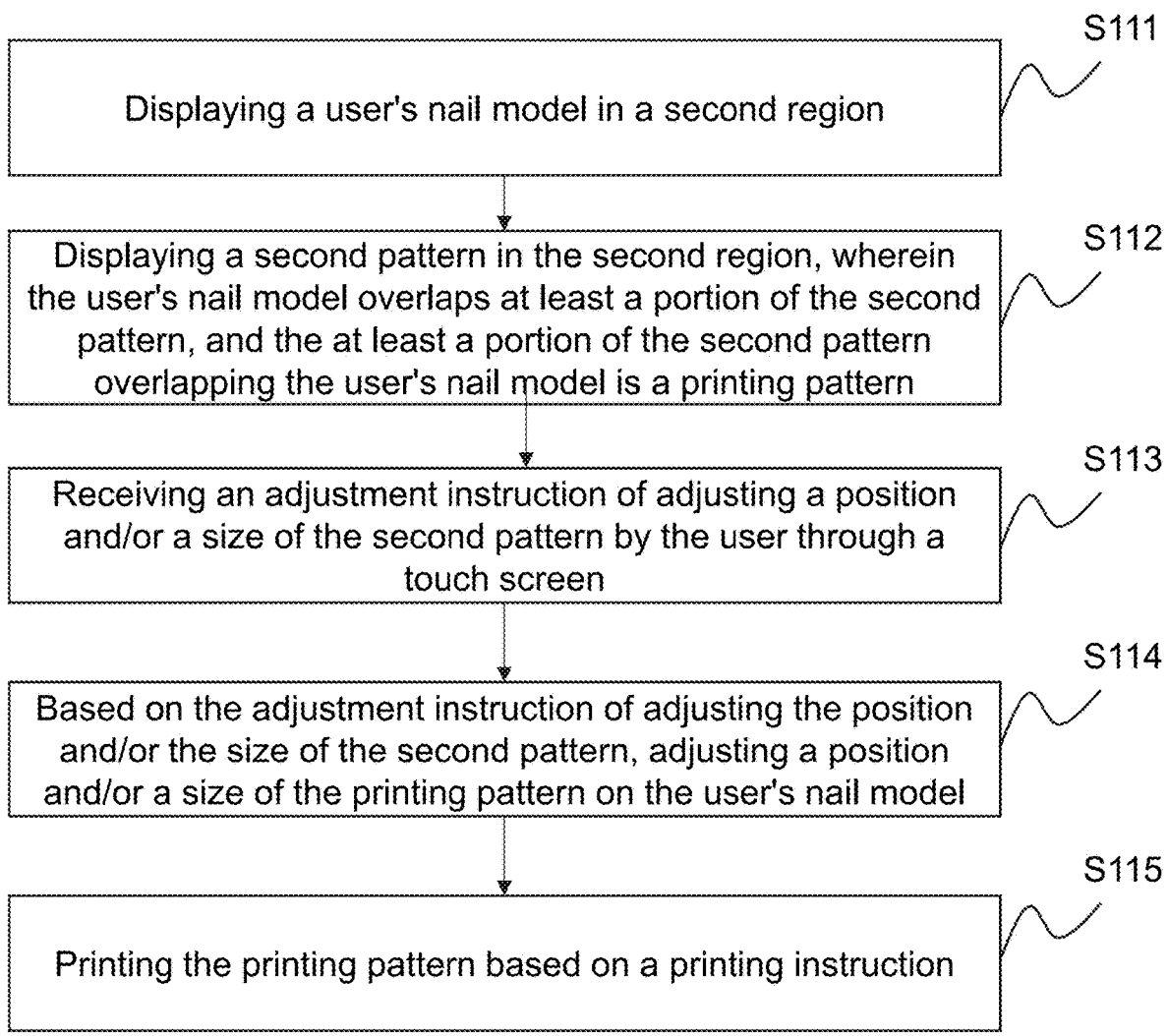
FIG. 13 is a flowchart illustrating a printing method of a nail printing apparatus according to an eleventh embodiment of the present disclosure.

Referring to FIG. 13, an eleventh embodiment of the present disclosure may also provide a printing method of a nail printing apparatus. This embodiment may provide a solution for adjusting a position of the first pattern based on the foregoing embodiments. The printing method of the nail printing apparatus may include:

S111: displaying a user's nail model in the second region;
S112: displaying a first pattern in the second region, wherein the user's nail model overlaps at least a portion of the first pattern, and the at least a portion of the first pattern overlapping the user's nail model is a printing pattern; and
S113: receiving an adjustment instruction of adjusting the position and/or a size of the first pattern by the user through a touch screen;
S114: based on the adjustment instruction of adjusting the position and/or the size of the first pattern, adjusting a position and/or the size of the printing pattern on the user's nail model; and
S115: printing the printing pattern based on a printing instruction.

It may be understood that, for each step of the printing method of the nail printing apparatus provided in this embodiment may refer to the steps of the nail printing method in the second embodiment, and the steps may be not explained and illustrated in this embodiment.

The eleventh embodiment of the present disclosure may provide the printing method of the nail printing apparatus. The user may adjust the first pattern according to the touch screen, which may be convenient for the user to adjust the pattern printed on the nail by adjusting the position and the size of the first pattern. The user may also view the pattern printed on the nail through the user's nail model.

Figure 14:
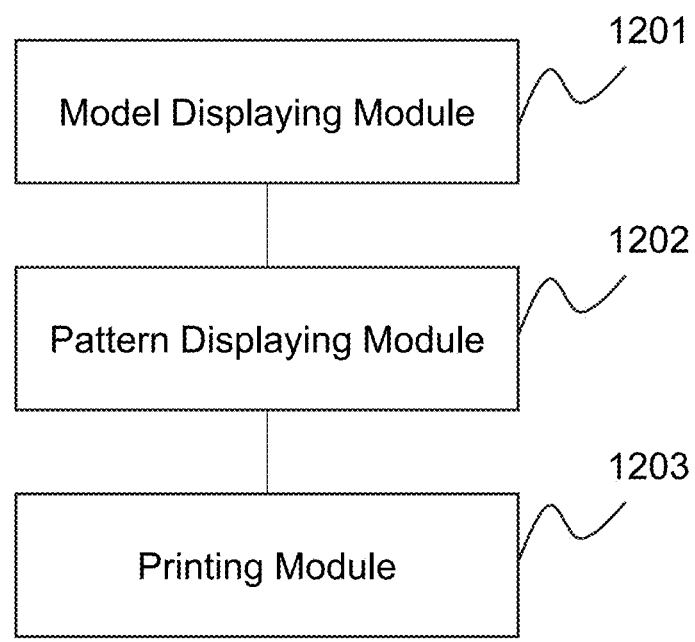
FIG. 14 is a structural diagram illustrating an exemplary printing system of the nail printing apparatus according to a twelfth embodiment of the present disclosure.

Referring to FIG. 14, an eleventh embodiment of the present disclosure may provide a printing system 1200 of a nail printing apparatus. The system 1200 may implement the printing method of the nail printing apparatus. The nail printing apparatus may include a touch screen. The touch screen may be configured to display the first interface. The first interface may include a third region and a second region. The third region may include a plurality of second patterns. The printing system 1200 of the nail printing apparatus may include:
a model displaying module 1201 configured to display a user's nail model in the second region;
a pattern displaying module 1202 configured to display a first pattern in the second region, wherein the user's nail model overlaps at least a portion of the first pattern, and the at least a portion of the first pattern overlapping the user's nail model is a printing pattern; and
a printing module 1203 configured to print the printing pattern based on a printing instruction.

The twelfth embodiment of the present disclosure may provide the printing method 1200 of the nail printing apparatus. The at least a portion of the pattern overlapped the user's nail model may be used as the printing pattern. Only the portion of the pattern overlapped the user's nail model may be printed during printing thereby reducing the pattern to be printed, saving ink, prolonging a usage time of the ink cartridge, and helping reduce costs. The pattern other than the user's nail model may be not printed. After the printing is completed, no ink may be sprayed on fingers around the nails, and it may be unnecessary to use an anti-overflow glue on the fingers around the nail, which may not only save the cost, but also reduce two processes of coating the anti-overflow glue before the printing and cleaning the anti-overflow glue after the printing and improve the nail printing efficiency.

The printing system 1200 of the nail printing apparatus may also include:
an obtaining module 41 is configured to obtain a region image of the user's nail,
a pattern identification module configured to identify a second pattern selected by the user in the third region;
a preview displaying module configured to display an effect print preview printed on the user's nail in the first region;
a first receiving module configured to receive an adjustment instruction of adjusting the position and/or the size of the first pattern through a touch screen;
an adjustment module configured to adjust the position and/or the size of the printing pattern on the user's nail model based on the adjustment instruction of adjusting the position and/or the size of the first pattern.
a second receiving module configured to receive a slide instruction; and
a sliding display module configured to display a plurality of second patterns in the third region after sliding according to the slide instruction;

The obtaining module may include:
a nail image obtaining module configured to obtain the image of the user's nail; and
a nail region image obtaining module configured to identify a region image of the nail according to the image of the user's nail.

The pattern identification module may include:
a first coordinate obtaining module configured to obtain a touch coordinate of the user in the third region; and
a pattern obtaining module configured to identify the second pattern corresponding to the touch coordinate.

Figure 15:
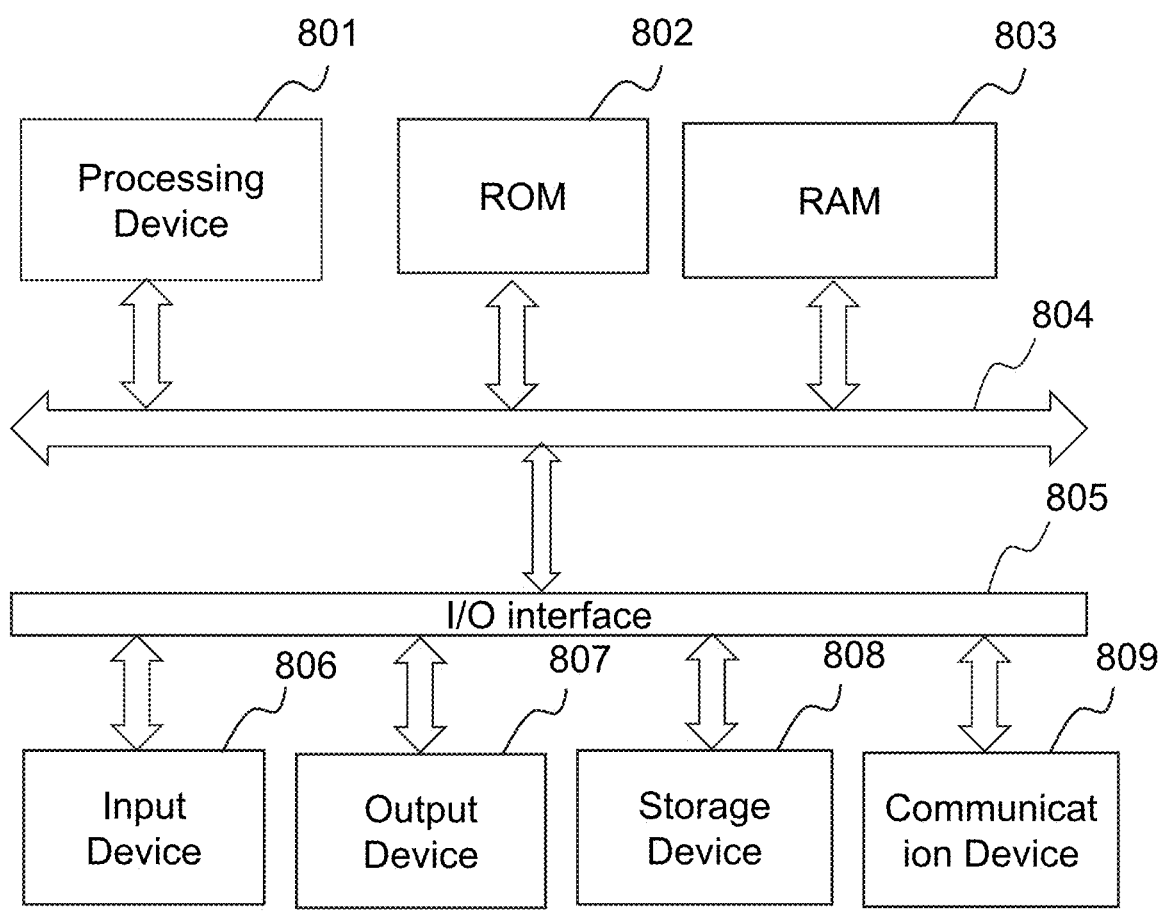
FIG. 15 is a structural diagram illustrating an exemplary nail printing apparatus according to a thirteenth embodiment of the present disclosure.

FIG. 15 is a structural diagram illustrating a nail printing method and/or a method for obtaining a nail image of a nail printing apparatus and/or a system for obtaining a nail image of a nail printing apparatus, an image processing method of a nail printing apparatus and/or an image processing system of a nail printing apparatus, a printing method of a nail printing apparatus and/or a printing system of the nail printing apparatus 800 according to some embodiments of the present disclosure. The nail printing apparatus may be any computing device capable of data process capability, e.g., a server or a server cluster. The nail printing apparatus shown in the figure may be merely an example and should not impose any limitation on the function and scope of use of the embodiments of the present disclosure.

As shown in the figure, the nail printing apparatus 800 may include a processing device (e.g., a central processor, a graphics processor, etc.) 801. The nail printing apparatus 800 may execute various appropriate actions and processes according to programs stored in the read-only storage (ROM) 802 or programs loaded from the storage device 808 to the random access storage (RAM) 803. The RAM 803 may store various programs and data required by the operations of the nail printing apparatus 800. The processing device 801, the ROM 802, and the RAM 803 may be connected to each other via a bus 804. An input/output (I/O) interface 805 may be also connected to bus 804.

Usually, a following device may connect to the I/O interface 805, such as an input device 806, e.g., a touch screen, a touchpad, a keyboard, a mouse, a camera, a microphone, an accelerometer or a gyroscope; an output device 807 e.g., a liquid crystal display (LCD), a speaker, a vibrator; a storage device 808 e.g., a tape and a hard disk; and a communication device 809. The communication device 809 may allow the nail printing apparatus 800 to perform wireless or wired communication with other devices to switch data. Although the nail printing apparatus 800 may have various devices as shown, it should be understood that the implementation or the possession of all of the illustrated devices may be not required. The nail printing apparatus 800 may be implemented alternatively or have more or fewer devices.

Figure 16:
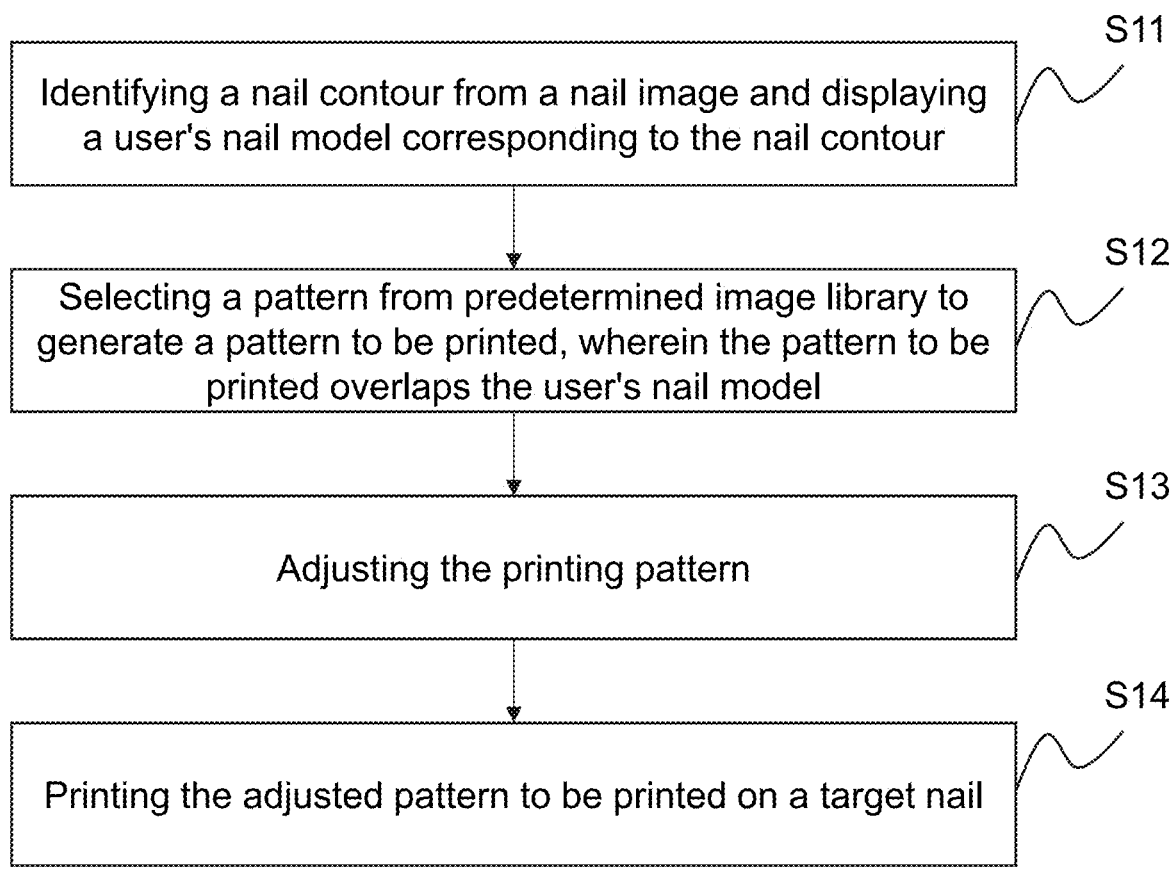
FIG. 16 is a flowchart illustrating a printing method of a nail printing apparatus according to a fourteenth embodiment of the present disclosure.

Referring to FIG. 16, a fourteenth embodiment of the present disclosure may provide a printing method of a nail printing apparatus used for nail printing a user's nail based on the foregoing embodiment. The nail printing apparatus may be the nail printing apparatus in the foregoing embodiments. The print method of the nail printing apparatus may include:
S11: identifying a nail contour from the nail image and displaying a user's nail model corresponding to the nail contour;
S12: selecting a pattern from a predetermined image library to generate a pattern to be printed, wherein the pattern to be printed overlaps the user's nail model;
S13: adjusting the pattern to be printed; and
S14: printing the adjusted pattern to be printed on a target nail.

In S11, the nail image may be obtained by the nail printing apparatus. The nail image may be taken by a camera device of the nail printing apparatus in the foregoing embodiments of the present disclosure. After the nail image is taken by the camera device, the nail image may be processed by a nail recognition and segmentation algorithm to obtain the nail contour of the user. The nail recognition and segmentation algorithm may be a method in the image processing, and in particular, how to obtain the nail contour may be not limited. After the nail contour is obtained, the user's nail model corresponding to the nail contour may be displayed. A shape of the user's nail model may coincide with a shape of the nail contour, and a size of the user's nail model may be the same as or different from a size of the nail contour. Specifically, the nail printing apparatus may include a touch screen configured to display a first interface. The first interface may include a second region. The identifying a nail contour from the nail image and displaying a user's nail model corresponding to the nail contour may include: identifying the nail contour from the nail image, and displaying the user's nail model corresponding to the nail contour in the second region. The nail printing apparatus may be the nail printing apparatus in the foregoing embodiment of the disclosure, and the second region may be not specifically described.

In S12, the predetermined image library may include a plurality of patterns, and the user may touch and select one from the plurality of patterns. Specifically, the first interface may further include a third region. The third region may be used for displaying the predetermined image library. The second pattern included in the predetermined image library may be the second patterns in the third region in the first embodiment of the disclosure. The predetermined image library may be a general call for the plurality of second patterns in the third region. The selecting a pattern from the predetermined image library may include single-clicking to select the pattern, double-clicking to select the pattern, or dragging the pattern. When the pattern to be printed is generated, a pattern to be printed may be generated in the second region. The pattern to be printed may be the first pattern in the first embodiment of the present disclosure. When the pattern to be printed overlaps the user's nail model, a center of the pattern to be printed overlaps a center of the user's nail model. A size of the pattern to be printed may be greater than, less than, or equal to a size of the user's nail model. Preferably, the size of the pattern to be printed may be larger than the size of the user's nail model for subsequent adjustment by the user. The selecting the pattern from the a predetermined image library, generating the print to be printed, the pattern to be printed overlapping the user's nail model may include: singe-clicking to select the pattern from the predetermined image in the third region, and generating the pattern to be printed coinciding with the selected pattern in the second region, the pattern to be printed overlapping the user's nail model displayed in the second region. Preferably, the first interface may further include a first region. The first region may be used for displaying a print effect image that the first pattern may match the user's nail model, i.e., determining a portion of the first pattern that matches a shape and the size of the user's nail model, fitting thereof with the user's nail model and then displaying thereof in the first region. Therefore, the user may preview the effect of printing the print pattern on the nail in the first region, so that the user may select the favorite pattern and adjust the pattern to an optimal printing effect, which is highly practical.

In S13, the adjusting the pattern to be printed may include adjusting the position and/or size of the pattern to be printed to adjust the pattern to be printed overlapped the user's nail model at different positions, or making the pattern to be printed located in the user's nail model. The adjusting the pattern to be printed may include a rotation adjustment, a horizontal mirror adjustment, a vertical mirror adjustment, a position adjustment, or a size adjustment. When the pattern to be printed is adjusted, the printing pattern may be adjusted in the second region e.g., proportionally scaling the pattern to be printed by multi-touching the touch screen and/or dragging the pattern to be printed through the touch screen. The adjusting the pattern to be printed may be specifically referred to the nail printing apparatus in the first embodiment of the present disclosure.

In S14, the target nail may include a fingernail, a toenail or an artificial nail. When the adjusted pattern to be printed is printed on the target nail, the portion of the adjusted pattern to be printed overlapped the user's nail model may be printed on the target nail, i.e., the pattern may be only printed within the contour of the user's nail. Only the pattern within the nail contour may be printed, which may save the ink, the ink may be not printed on the finger outside the nail, and further processing may be not required after the printing is completed, thereby improving the nail printing efficiency.

The embodiment of the present disclosure may provide the printing method of the nail printing apparatus. The nail contour may be identified from the nail image and the user's nail model corresponding to the nail contour may be displayed. The pattern may be selected from the predetermined image library to generate the pattern to be printed. The pattern to be printed may overlap the user's nail model. The pattern to be printed may be adjusted and the adjusted pattern to be printed may be printed on the target nail. The pattern to be printed on the target nail may be selected quickly and the pattern to be printed may be conveniently adjusted after selecting the pattern to obtain the desired size or desired position.

It should be understood that the nail printing apparatus in the forgoing embodiments of the present disclosure may supplement and explain the printing method of the nail printing apparatus in this embodiment of the present disclosure.

The present disclosure may disclose a computer readable medium storing a computer program. When the program is executed by the processing device, the nail printing method and/or the method for obtaining the nail image of the nail printing apparatus and/or the image processing method of the nail printing apparatus and/or the printing method of the nail printing apparatus provided by any of the above embodiments may be implemented.

In particular, according to an embodiment of the present disclosure, the nail printing method and/or the method for obtaining the nail image of the nail printing apparatus and/or the image processing method of the nail printing apparatus and/or the printing method of the nail printing apparatus referred to the flowchart described above may be implemented as a computer software program. For example, an embodiment of the present disclosure may include a computer program product comprising a computer program embodied on the computer readable medium. The computer program may include program codes for executing the method shown in the flowchart. In such an embodiment, the computer program may be downloaded and installed from the network via the communication apparatus 809, or installed from the storage apparatus 808, or installed from the ROM 802. When the computer program is executed by the processed program 801, the nail printing method and/or the method for obtaining the nail image of the nail printing apparatus and/or the image processing method of the nail printing apparatus and/or the printing method of the nail printing apparatus of the embodiment of the present disclosure may be executed the functions defined in the method and/or the nail printing apparatus image processing method and/or the printing method of the nail printing apparatus.

It should be noted that the computer readable medium of the present disclosure may be a computer readable signal medium or a computer readable storage medium or a combination thereof. For example, the computer readable storage medium may include but is not limited to, an electronic, magnetic, optical, electromagnetic, infrared, or semi conductive system, apparatus, or device, or any combination of thereof. More specific examples of the machine readable storage medium may include electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of thereof. In the context of this disclosure, the computer readable medium may be any tangible medium that may contain or store a program. The program may be used by an instruction execution system, an apparatus, a component or a combination thereof. In the present disclosure, however, the computer readable signal medium may include a data signal propagated in the baseband or as part of a carrier. The computer readable signal medium may carry the computer readable program code. The propagated signal may be in a variety of forms, including but being not limited to electro-magnetic, optical, or the like, or any suitable combination thereof. The computer readable signal medium may be any computer readable medium other than the computer readable storage medium, which may communicate, propagate, or transport a program used by the instruction execution system, apparatus, device, or a combination thereof. The program code embodied in the computer readable signal medium may be transmitted by any appropriate medium, including but being not limited to wireless, wireline, optical fiber cable, RF, or the like, or any suitable combination thereof.

The computer readable medium may be included in the nail printing apparatus, and may exist independently and not be incorporated in the nail printing apparatus.

The computer readable medium may carry one or more programs. When the one or more programs are executed by the nail printing apparatus, the nail printing apparatus may be directed to: obtain at least two internet protocol addresses; transmit, to a node evaluation device, a node evaluation request of the at least two internet protocol addresses, wherein the node evaluation device selects an internet protocol address from the at least two internet protocol addresses and returns thereto; receive the internet protocol address returned by the node evaluation device; wherein the obtained internet protocol address indicates an edge node in a content distribution network.

Alternatively, the computer readable medium may carry one or more programs. When the one or more programs are executed by the nail printing apparatus, the nail printing apparatus may be directed to: receive a node evaluation request of at least two internet protocol addresses; select an internet protocol address from the at least two internet protocol addresses; and return to the selected internet protocol address; wherein the received internet protocol address indicates an edge node in a content distribution network.

The computer program code for performing the operations of the present disclosure may be written in one or more programming languages, or a combination thereof. The programming language may include object oriented programming languages such as Java, Smalltalk, C++; and conventional procedural programming languages such as the "C" language or similar programming languages. The program code may execute entirely on the user's computer, partly on the user's computer, as an independent software package, partly on the user's computer, partly on a remote computer, or entirely on the remote computer or server. In the case of the remote computer, the remote computer may be connected to the user's computer via any kind of network, e.g., including a local region network (LAN) or a wide region network (WAN), or may be connected to an external computer (e.g., using an Internet service provider to connect over the Internet).

The flowcharts and block diagrams in the figures may illustrate the architecture, functions, and operations possibly implemented by the systems, methods, and the computer program products in accordance with the various embodiments of the present disclosure. At this position, each block in the flowchart or the block diagram may represent a module, a program segment, or a portion of code, which may include one or more executable instructions for implementing the specified logical functions. It should also be noted that in some alternative implementations, the functions noted in the blocks may also occur in a different order other than those illustrated in the drawings. For example, two successively blocks may be executed substantially in parallel, and may be executed in reverse order sometimes, which may depend upon the involved function. It should be also noted that each block of the block diagrams and/or flowcharts, and a combination of blocks in the block diagrams and/or flowcharts, may be implemented by a dedicated hardware-based system that performs the specified function or operation, or may be implemented by a combination of dedicated hardware and computer instructions.

The modules or units described in the embodiments of the present disclosure may be implemented by means of software or by hardware. The name of the unit may not constitute a limitation on the unit itself under certain circumstances. For example, the first obtaining unit may also be described as "a unit that obtains at least two internet protocol addresses."

The above description may be only a preferred embodiment of the present disclosure and a description of the principles of the applied technology. Those skilled in the art should understand that the disclosure scope of the present disclosure may be not limited to the specific combination of the technical features, and other technical solutions formed by any combination of the technical features or their equivalent features may be also included without departing from the disclosed concept. For example, the feature may be formed by replacing the feature disclosed in the present disclosure (but being not limited to) with a technology feature having a similar function.

It should be noted that the only preferred embodiment of the present disclosure and the technical principles may be described above. A person skilled in the art may appreciate that the present disclosure is not limited to the specific embodiments described herein, and that various modifications, alterations and substitutions may be made by those skilled in the art without departing from the scope of the disclosure. Therefore, although the present disclosure may be described in more detail by the above embodiments, the present disclosure may be not limited to the above embodiments, and many other equivalent embodiments may be included without departing from the scope of the present disclosure. The scope of the present disclosure may be determined by the scope of the appended claims.

What is claimed is:

1. A printing method of a nail printing apparatus, wherein the nail printing apparatus includes:
   a first interface, the first interface including a first region configured to display an effect print image that a first pattern matches a user's nail model and a second region configured to display the user nail's model and the first pattern, and for the user to touch to adjust a position of the first pattern or proportionally zoom in or out the first pattern, and the first pattern coincides with a second pattern, and the printing method of the nail printing apparatus includes:

identifying a nail contour from an image of a user's nail and displaying the user's nail model corresponding to the nail contour;

selecting the second pattern from a predetermined image library to generate the first pattern, the first pattern overlapping the user's nail model;

displaying an effect print image of a printing pattern printed on the user's nail in the first region;

adjusting the first pattern in the second region; and printing a portion of the adjusted first pattern overlapping the user's nail model on the user's nail.

2. The printing method of the nail printing apparatus of claim 1, wherein the first pattern overlapping the user's nail model includes:

a center of the first pattern overlaps a center of the user's nail model.

3. The printing method of the nail printing apparatus of claim 1, wherein adjusting the first pattern includes:

adjusting a position of the first pattern by touching the touch screen;

proportionally zooming in or out the first pattern by touching the touch screen; or adjusting the first pattern based on at least one of a rotation adjustment, a horizontal mirror adjustment, a vertical mirror adjustment.

4. A nail printing apparatus, wherein the nail printing apparatus includes a touch screen, the touch screen is configured to display a first interface, and the first interface includes a first region, a second region, and a third region:

the first region is configured to display a plurality of first patterns, and for the user to touch to select a first pattern from the plurality of first patterns; and the second region is configured to display a user nail's model and a second pattern, and for the user to touch to adjust a position of the second pattern or proportionally zoom in or out the second pattern, and the second pattern coincides with the selected first pattern, and the third region is configured to display an effect print image that the second pattern matches the user's nail model.

5. The nail printing apparatus of claim 4, wherein the first interface also includes a fourth region, and the fourth region is configured to display an operation icon and the operation icon is touched by the user to perform a corresponding operation.

6. The nail printing apparatus of claim 5, wherein the touch screen also includes a second interface, and the second interface includes a fifth region and a sixth region:

the fifth region is configured to display image catalogues, a third pattern under a selected image catalogue, and for the user to touch to select the third pattern; and the sixth region is configured to display an operation icon, and for the user to touch the operation icon to enter a corresponding operation interface.

7. The nail printing apparatus of claim 6, wherein when the touch screen displays the second interface, the second interface also includes a seventh region and an eighth region, the seventh region is configured to display account management information and for the user to touch to input account information, and the eighth region is used for the user to select a video for playing, and perform a touch operation on the played video.

8. The nail printing apparatus of claim 4, wherein the second region is configured to display the user's nail model in real-time in a first time period, display an effect image of overlap between the user's nail model and the second pattern in real-time in a second time period; display an effect image of overlap between the user's nail model and the adjusted second pattern in real-time when the second pattern is adjusted by the user, and display a printing process of printing the overlapped pattern between the second pattern and the user's nail model in a third time period.

9. An image processing method of a nail printing apparatus, wherein the nail printing apparatus includes:

a touch screen; wherein the touch screen is configured to display a first interface, the first interface includes a first region and a second region, the first region includes a plurality of first patterns and the image processing method of the manicuring apparatus includes:

displaying a user's nail model in the second region;

identifying a first pattern selected by a user in the first region; and displaying a second pattern in the second region, wherein the second pattern coincides with the first pattern and when a center of the user's nail model moves, a center of the second pattern moves such that the center of the second pattern and the center of the user's nail model coincide.

10. The image processing method of the nail printing apparatus of claim 9, before the displaying a user's nail model in the second region, also comprising:

obtaining an image of the user's nail; and identifying an image of a region of the user's nail based on the image of the user's nail, wherein the user's nail model coincides with the image of a region of the user's nail.

11. The image processing method of the nail printing apparatus of claim 9, before the displaying a second pattern in the second region, also comprising:

generating the second pattern from the first pattern based on a predetermined ratio such that a size of the second pattern matches a size of the user's nail model.

12. The image processing method of the nail printing apparatus of claim 9, further comprising:

adjusting a position of the second pattern by touching the touch screen;

proportionally zooming in or out the second pattern by touching the touch screen; or adjusting the second pattern based on at least one of a rotation adjustment, a horizontal mirror adjustment, or a vertical mirror adjustment.

* * * * *